US009020638B2

(12) United States Patent
Iida

(10) Patent No.: US 9,020,638 B2
(45) Date of Patent: *Apr. 28, 2015

(54) POSITION CONTROL METHOD AND ROBOT

(71) Applicant: Seiko Epson Corporation, Tokyo (JP)

(72) Inventor: Izumi Iida, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/093,882

(22) Filed: Dec. 2, 2013

(65) Prior Publication Data

US 2014/0088762 A1   Mar. 27, 2014

Related U.S. Application Data

(63) Continuation of application No. 13/849,098, filed on Mar. 22, 2013, now Pat. No. 8,655,488, which is a continuation of application No. 12/828,539, filed on Jul. 1, 2010, now Pat. No. 8,452,449.

(30) Foreign Application Priority Data

Jul. 6, 2009   (JP) ................................. 2009-159557

(51) Int. Cl.
*G06F 19/00*   (2011.01)
*B25J 9/10*   (2006.01)
(Continued)

(52) U.S. Cl.
CPC   *B25J 9/10* (2013.01); *Y10T 156/19* (2015.01); *B25J 9/1638* (2013.01); *B25J 9/1697* (2013.01); *G05B 19/404* (2013.01); *G05B 2219/39199* (2013.01); *G05B 2219/40549* (2013.01); *G05B 2219/41117* (2013.01); *G05B 2219/41122* (2013.01); *G05B 2219/41123* (2013.01); *G05B 2219/41168* (2013.01); *B25J 9/1694* (2013.01); *B25J 19/04* (2013.01)

(58) Field of Classification Search
CPC ............ B25J 19/04; B25J 9/10; B25J 9/1638; B25J 9/1694; B25J 9/1697
USPC ........ 700/253, 254, 258; 318/568.1; 414/411; 156/750
See application file for complete search history.

(56) References Cited

U.S. PATENT DOCUMENTS 5,333,819 A   8/1994   Stetson, Jr.
6,092,678 A   7/2000   Kawano et al.
(Continued)

FOREIGN PATENT DOCUMENTS

JP   07-314360   12/1995
JP   11-349280   12/1999
(Continued)

OTHER PUBLICATIONS

Mack, Minimally Invasive and Robotic Surgery, 2001 Internet, p. 568-572.

*Primary Examiner* — McDieunel Marc
(74) *Attorney, Agent, or Firm* — Harness, Dickey & Pierce, P.L.C.

(57) ABSTRACT

A position control method for controlling a position of a movable portion, includes: performing control of allowing the movable portion to approach a predetermined position by moving the movable portion; and performing control of moving the movable portion to the predetermined position by moving the movable portion and detecting a relative position of the movable portion with respect to the predetermined position by using an imaging unit.

11 Claims, 11 Drawing Sheets

(51) Int. Cl.
*B25J 9/16* (2006.01)
*G05B 19/404* (2006.01)
*B25J 19/04* (2006.01)

(56) References Cited

U.S. PATENT DOCUMENTS

| | | | |
|---|---|---|---|
| 6,597,971 B2 | 7/2003 | Kanno |
| 6,741,912 B2 | 5/2004 | Olesen et al. |
| 6,836,700 B2 | 12/2004 | Greene et al. |
| 7,123,992 B2 | 10/2006 | Ban et al. |
| 7,313,464 B1 | 12/2007 | Perreault et al. |
| 7,403,669 B2 | 7/2008 | Aoyama |
| 7,415,321 B2 | 8/2008 | Okazaki et al. |
| 7,558,647 B2 | 7/2009 | Okazaki |
| 7,580,773 B2 | 8/2009 | Hariki et al. |
| 7,640,076 B2 | 12/2009 | Olson |
| 7,653,458 B2 | 1/2010 | Koga et al. |
| 7,656,388 B2 | 2/2010 | Schena et al. |
| 7,860,614 B1 | 12/2010 | Reger |
| 8,452,449 B2 * | 5/2013 | Iida ............... 700/253 |
| 8,655,488 B2 * | 2/2014 | Iida ............... 700/253 |
| 2005/0246061 A1 | 11/2005 | Oaki et al. |
| 2007/0017081 A1 | 1/2007 | Becker et al. |
| 2008/0300723 A1 | 12/2008 | Ban et al. |

FOREIGN PATENT DOCUMENTS

| | | |
|---|---|---|
| JP | 2004-261881 A | 9/2004 |
| JP | 2005-537990 A | 12/2005 |
| JP | 3883544 B2 | 11/2006 |
| JP | 2010-152664 A | 7/2010 |
| WO | WO-2004-052598 | 6/2004 |

* cited by examiner

POSITION CONTROL METHOD AND ROBOT

CROSS-REFERENCE TO RELATED APPLICATIONS

This application is a continuation application of U.S. application Ser. No. 13/849,098 filed Mar. 22, 2013, which is a continuation application of U.S. application Ser. No. 12/828,539 filed Jul. 1, 2010, now U.S. Pat. No. 8,452,449 issued May 28, 2013, which claims priority to Japanese Patent Application No. 2009-159557 filed Jul. 6, 2009 all of which are expressly incorporated by reference herein in their entireties.

BACKGROUND

1. Technical Field

The present invention relates to a position control method, and more particularly, to a control method for implementing high position precision.

2. Related Art

Robots having a joint link (hereinafter, referred to as an arm) of multiple joints are used in apparatuses having many assembled devices or the like. When such robots move the arm and stop the arm, the arm vibrates. While the arm vibrates, a robot hand that is disposed on the tip end of the arm also vibrates. While the robot hand vibrates, it is difficult for the robot hand to perform an operation such as an operation of gripping the work. Accordingly, the operation needs to wait for the vibration of the robot hand to stop.

In order to improve the productivity of the robots, a method of shortening a vibration time of the robot hand is disclosed in Japanese Patent No. 3,883,544. According to the method, an angle sensor that detects the rotation angle of the arm is disposed in an actuator of the arm. In addition, an angular velocity sensor that detects the vibration of the arm is disposed on the hand side of the arm. Then, the low-frequency component of the output of the angle sensor is extracted by using a low-pass filter, and the high-frequency component of the output of the angular velocity sensor is extracted by using a high-pass filter. Next, the operation of the arm is detected by composing the output of the angle sensor and the output of the angular velocity sensor. Then, the vibration of the arm is suppressed by controlling the arm in response to the operation of the arm.

The actuator is formed by a motor and the like and is driven by being supplied with power. Then, when the driving time is long, the motor generates heat. As the heat of the motor is conducted to the arm, the temperature of the arm rises. As the temperature of the arm rises, the arm expands. Accordingly, the length of the arm may be changed. In addition, when the robot hand grips the work, the arm may be bent due to the weight of the work. In such a case, the position of the robot hand with respect to the actuator changes. A method of controlling the arm with high position precision even in a case where the arm is deformed as described above is desired.

SUMMARY

An advantage of some aspects of the invention is that it provides a position control method and a robot. The invention may be implemented in the following forms or applications.

According to this application example of the invention, there is provided a position control method for controlling a position of a movable portion. The position control method includes: performing control of allowing the movable portion to approach a predetermined position by moving the movable portion; and performing control of moving the movable portion to the predetermined position by moving the movable portion and detecting a relative position of the movable portion with respect to the predetermined position by using an imaging unit.

According to the above-described position control method, the movement of the movable portion is controlled through the performing of control of allowing the movable portion to approach a predetermined position and the performing of control of moving the movable portion to the predetermined position. In the performing of control of allowing the movable portion to approach a predetermined position, the movement amount of the movable portion is controlled by detecting the movement amount of the movable portion. In the performing of control of moving the movable portion to the predetermined position, the position of the movable portion is controlled by detecting the position of the movable portion by using the imaging unit. Accordingly, in the performing of control of allowing the movable portion to approach a predetermined position, the movement of the movable portion can be controlled more quickly than in the performing of control of moving the movable portion to the predetermined position. In addition, in the performing of control of moving the movable portion to the predetermined position, the movable portion is controlled by detecting the position of the movable portion and the predetermined position. Therefore, the movable portion can be reliably moved to the predetermined position with high precision.

The above-described position control method further includes suppressing vibration of the movable portion based on movement of the movable portion that is detected by using an inertial sensor. A vibration suppressing period during which the vibration of the movable portion is suppressed is overlapped with at least apart of a movement period during which the control of allowing the movable portion to approach the predetermined position is performed or the control of moving the movable portion to the predetermined position is performed.

According to such a position control method, the vibration of the movable portion is detected in the suppressing of vibration of the movable portion. Then, the vibration of the movable portion is suppressed. When the suppressing of vibration of the movable portion is performed so as to be partially overlapped with the performing of control of allowing the movable portion to approach a predetermined position or the performing of control of moving the movable portion to the predetermined position, the movable portion can be moved while suppressing the vibration thereof. When the amplitude of vibration of the movable portion is decreased in the performing of control of allowing the movable portion to approach a predetermined position, the amplitude of vibration of the movable portion at the time of transition to the performing of control of moving the movable portion to the predetermined position can be decreased. Accordingly, also in the performing of control of moving the movable portion to the predetermined position, the amplitude of vibration of the movable portion can be decreased. Also when the suppressing of vibration of the movable portion is performed so as to be overlapped with the performing of control of moving the movable portion to the predetermined position, the amplitude of vibration of the movable portion can be decreased. Since the amplitude of vibration of the movable portion is decreased, the imaging unit can photograph an image with a little shake. Accordingly, the imaging unit uses a high-quality image, whereby the location of the movable portion can be detected with high precision.

In the above-described position control method, in the suppressing of the vibration of the movable portion, the vibration of the movable portion is suppressed by detecting the vibration of the movable portion by using the inertial sensor and adding vibration having a phase opposite to that of the vibration to the movable portion.

According to such a position control method, vibration having a phase that is opposite to that of the detected vibration is added to the movable portion. Accordingly, the vibration of the movable portion can be reliably suppressed.

In the above-described position control method, in the performing of control of allowing the movable portion to approach a predetermined position, a distance between the predetermined position and the movable portion is detected, and when the distance becomes a predetermined distance, the process transits from the performing of control of allowing the movable portion to approach a predetermined position to the performing of control of moving the movable portion to the predetermined position.

According to such a position control method, the distance between the predetermined position and the movable portion is detected. There is a case where the predetermined position is moved. Even in such a case, the process can transit from the performing of control of allowing the movable portion to approach a predetermined position to the performing of control of moving the movable portion to the predetermined position when the distance between the predetermined position and the movable portion becomes a predetermined distance.

In the above-described position control method, in the performing of control of allowing the movable portion to approach a predetermined position, the distance between the movable portion and the predetermined position is detected by photographing the movable portion and the predetermined position.

According to such a position control method, the distance between the movable portion and the predetermined position can be detected by analyzing a photographed image. Accordingly, the predetermined position can be detected only by allowing the predetermined position to be visually recognizable. As a result, the distance between the movable portion and the predetermined position can be detected in a simple manner.

In the above-described position control method, a required time in which the distance between the movable portion and the predetermined position becomes a predetermined distance is calculated, and in a case where the time elapses in the performing of control of allowing the movable portion to approach a predetermined position, the process transits from the performing of control of allowing the movable portion to approach a predetermined position to the performing of control of moving the movable portion to the predetermined position.

According to such a position control method, the time required for transition from the performing of control of allowing the movable portion to approach a predetermined position to the performing of control of moving the movable portion to the predetermined position is calculated. Then, when the calculated time elapses, the process transits from the performing of control of allowing the movable portion to approach a predetermined position to the performing of control of moving the movable portion to the predetermined position. In a case where the above-described method is not used, a method in which the location of the movable portion is detected by using a measurement device, and the process transits from the performing of control of allowing the movable portion to approach a predetermined position to the performing of control of moving the movable portion to the predetermined position in a case where the movable portion is positioned at a predetermined location may be used. When such a method is used, the measurement device is driven, whereby energy is consumed. The method in which the determination is made based on the elapsed time is a position control method capable of saving resources, compared to the case where a measurement device is used.

In the above-described position control method, the relative position of the movable portion with respect to the predetermined position is detected by imaging a mark from which relative position information with respect to the predetermined position can be acquired and analyzing an imaged image.

According to such a position control method, the imaging unit photographs a mark. When the imaging unit is disposed in the movable portion, the relative positions of the mark and the movable portion can be recognized by detecting the relative positions of the imaging unit and the mark. On the other hand, when the imaging unit is not disposed in the movable portion, the relative positions of the mark and the movable portion can be recognized by photographing the mark and the movable portion by using the imaging unit. The position of the location of the mark with respect to a predetermined position is known. Accordingly, by analyzing the location of the mark and the location of the movable portion, the location of the movable portion with respect to the predetermined position can be detected. As a result, even when the predetermined position cannot be photographed, the relative positions of the location of the movable portion and the predetermined position can be recognized by detecting the mark.

In the above-described position control method, the predetermined position is on a vertical line passing through a location at which a work is disposed, and the mark is disposed on the work.

According to such a position control method, a marker disposed in the work is used as the mark. Thus, by photographing the marker disposed in the work and moving the movable portion, the movable portion can be moved to the location at which the work is positioned. Even in a case where the work is not visually distinguished and it is difficult to recognize the shape of the work, the position of the work can be easily recognized by using the mark.

In the above-described position control method, the mark is formed so as to form a predetermined shape by irradiating light thereon.

According to such a position control method, the mark is formed by irradiating light thereon. Accordingly, the image of the mark in the image photographed when the mark is photographed becomes an image having high contrast. As a result, the image of the mark can be easily detected from the photographed image.

According to this application example of the invention, there is provided a position control method for controlling a position of a movable portion. The position control method includes: allowing the movable portion to approach a predetermined position by moving the movable portion and detecting an amount of movement of the movable portion; moving the movable portion to the predetermined position by moving the movable portion and detecting a relative position of the movable portion with respect to the predetermined position by using an imaging unit; and suppressing vibration of the movable portion based on movement of the movable portion that is detected by using an inertial sensor.

According to the above-described position control method, the amount of information on the movement amount that is detected in the performing of control of allowing the movable portion to approach a predetermined position is smaller than that of information on the location that is detected in the performing of control of moving the movable portion to the predetermined position. Accordingly, in the performing of control of allowing the movable portion to approach a predetermined position, calculation for the control process can be performed more quickly than in the performing of control of moving the movable portion to the predetermined position. Therefore, in the performing of control of allowing the movable portion to approach a predetermined position, a control process for moving the movable portion can be performed more quickly than in the performing of control of moving the movable portion to the predetermined position. In the performing of control of moving the movable portion to the predetermined position, the movable portion is controlled by detecting the location of the movable portion and the location of the target. Accordingly, the movable portion can be reliably moved to a predetermined position. In the suppressing of vibration of the movable portion, the movement of the movable portion is detected. In addition, by controlling the vibration of the movable portion to be suppressed based on the movement, unnecessary vibration of the movable portion is suppressed. Since the amplitude of vibration of the movable portion is small, the location of the movable portion can be easily detected. As a result, the location of the movable portion can be detected with high precision.

According to this application example of the invention, there is provided a robot including: a movable portion; an imaging unit that detects a relative position of the movable portion with respect to a predetermined position; a first movement control unit that performs control to allow the movable portion to approach the predetermined position; and a second movement control unit that performs control to move the movable portion to the predetermined position by using information on an image photographed by the imaging unit.

According to the above-described robot, the first movement control unit allows the movable portion to approach the predetermined position. The imaging unit detects the location at which the movable portion is positioned and outputs the information on the position of the movable portion to the second movement control unit. Then, the second movement control unit moves the movable portion to the predetermined position.

When the first movement control unit allows the movable portion to approach the predetermined position, the precision of the position is not required. Accordingly, the movable portion can be moved in a speedy manner. The second movement control unit controls the movable portion by using the information on the position of the movable portion that is detected by the imaging unit. Accordingly, the movable portion can be reliably moved to the predetermined position. Therefore, the position of the movable portion can be controlled with high precision.

In the above-described robot, the imaging unit is disposed in the movable portion.

According to such a robot, the imaging unit photographs the target location. Then, by analyzing an image photographed by the imaging unit, the relative positions of the imaging unit and the target location can be calculated. Since the imaging unit is disposed in the movable portion, the relative positions of the movable portion and the target location can be detected. As a result, the position of the target can be detected with high precision.

In the above-described robot, a range in which the movable portion is moved is included in a range photographed by the imaging unit.

According to such a robot, the imaging unit can reliably photograph the movable portion. Then, the relative positions of the movable portion, which is photographed in an image, and the imaging unit can be calculated by analyzing the image photographed by the imaging unit. Accordingly, the relative positions of the movable portion and the imaging unit can be detected.

The above-described robot, further includes a driving unit that drives the movable portion, and the driving unit includes a step motor.

The driving signal of the step motor is a pulse waveform, and the driving shaft of the step motor is rotated in correspondence with the number of waves of the pulse waveforms. Accordingly, the movement amount of the movable portion can be controlled by controlling the driving signal of the step motor. A rotary encoder is not necessary for the step motor. However, there are cases where a step-out phenomenon occurs in which the current rotation angle is lost. According to such a position control device, the movable portion can be moved to a predetermined position by using the step motor as the imaging unit detects the position of the movable portion after recovery from the step-out phenomenon. In addition, a rotary encoder is not necessary for the step motor. Accordingly, the configuration can be simplified.

BRIEF DESCRIPTION OF THE DRAWINGS

The invention will be described with reference to the accompanying drawings, wherein like numbers reference like elements.

Figure 1A:
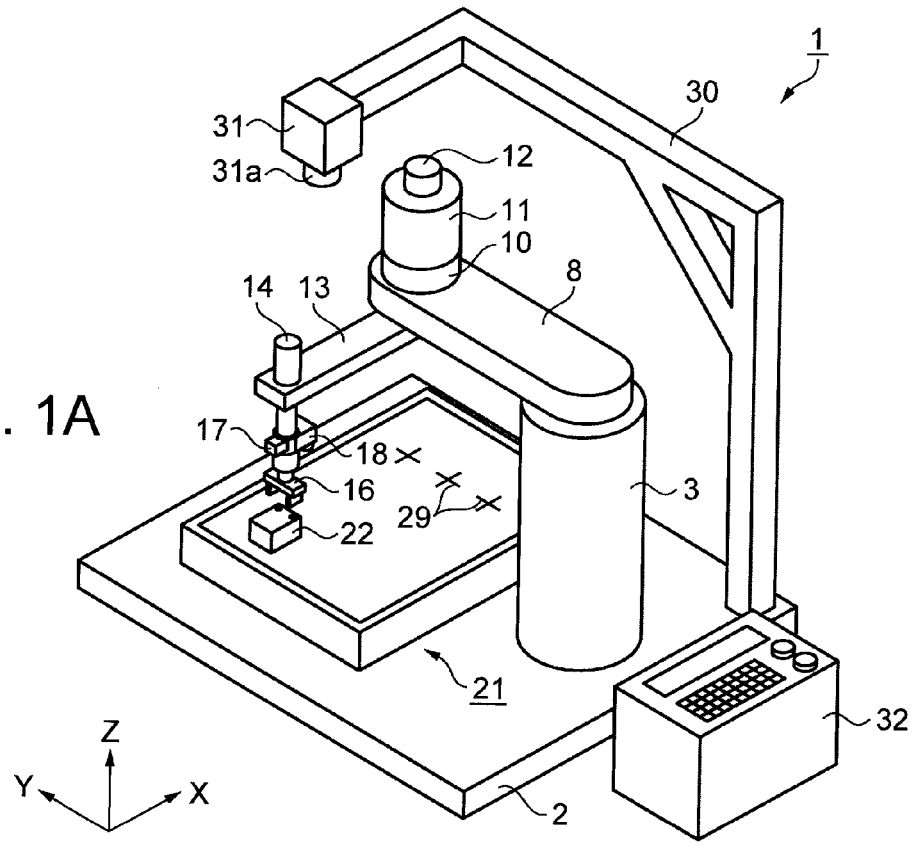
FIG. 1A is a schematic perspective view showing the configuration of a robot according to a first embodiment of the invention.

According to this application example of the invention, there is provided a position control method for controlling a position of a movable portion. The position control method includes: performing control of allowing the movable portion to approach a predetermined position by moving the movable portion; and performing control of moving the movable portion to the predetermined position by moving the movable portion and detecting a relative position of the movable portion with respect to the predetermined position by using an imaging unit.

According to the above-described position control method, the movement of the movable portion is controlled through the performing of control of allowing the movable portion to approach a predetermined position and the performing of control of moving the movable portion to the predetermined position. In the performing of control of allowing the movable portion to approach a predetermined position, the movement amount of the movable portion is controlled by detecting the movement amount of the movable portion. In the performing of control of moving the movable portion to the predetermined position, the position of the movable portion is controlled by detecting the position of the movable portion by using the imaging unit. Accordingly, in the performing of control of allowing the movable portion to approach a predetermined position, the movement of the movable portion can be controlled more quickly than in the performing of control of moving the movable portion to the predetermined position. In addition, in the performing of control of moving the movable portion to the predetermined position, the movable portion is controlled by detecting the position of the movable portion and the predetermined position. Therefore, the movable portion can be reliably moved to the predetermined position with high precision.

The above-described position control method further includes suppressing vibration of the movable portion based on movement of the movable portion that is detected by using an inertial sensor. A vibration suppressing period during which the vibration of the movable portion is suppressed is overlapped with at least apart of a movement period during which the control of allowing the movable portion to approach the predetermined position is performed or the control of moving the movable portion to the predetermined position is performed.

According to such a position control method, the vibration of the movable portion is detected in the suppressing of vibration of the movable portion. Then, the vibration of the movable portion is suppressed. When the suppressing of vibration of the movable portion is performed so as to be partially overlapped with the performing of control of allowing the movable portion to approach a predetermined position or the performing of control of moving the movable portion to the predetermined position, the movable portion can be moved while suppressing the vibration thereof. When the amplitude of vibration of the movable portion is decreased in the performing of control of allowing the movable portion to approach a predetermined position, the amplitude of vibration of the movable portion at the time of transition to the performing of control of moving the movable portion to the predetermined position can be decreased. Accordingly, also in the performing of control of moving the movable portion to the predetermined position, the amplitude of vibration of the movable portion can be decreased. Also when the suppressing of vibration of the movable portion is performed so as to be overlapped with the performing of control of moving the movable portion to the predetermined position, the amplitude of vibration of the movable portion can be decreased. Since the amplitude of vibration of the movable portion is decreased, the imaging unit can photograph an image with a little shake. Accordingly, the imaging unit uses a high-quality image, whereby the location of the movable portion can be detected with high precision.

In the above-described position control method, in the suppressing of the vibration of the movable portion, the vibration of the movable portion is suppressed by detecting the vibration of the movable portion by using the inertial sensor and adding vibration having a phase opposite to that of the vibration to the movable portion.

According to such a position control method, vibration having a phase that is opposite to that of the detected vibration is added to the movable portion. Accordingly, the vibration of the movable portion can be reliably suppressed.

In the above-described position control method, in the performing of control of allowing the movable portion to approach a predetermined position, a distance between the predetermined position and the movable portion is detected, and when the distance becomes a predetermined distance, the process transits from the performing of control of allowing the movable portion to approach a predetermined position to the performing of control of moving the movable portion to the predetermined position.

According to such a position control method, the distance between the predetermined position and the movable portion is detected. There is a case where the predetermined position is moved. Even in such a case, the process can transit from the performing of control of allowing the movable portion to approach a predetermined position to the performing of control of moving the movable portion to the predetermined position when the distance between the predetermined position and the movable portion becomes a predetermined distance.

In the above-described position control method, in the performing of control of allowing the movable portion to approach a predetermined position, the distance between the movable portion and the predetermined position is detected by photographing the movable portion and the predetermined position.

According to such a position control method, the distance between the movable portion and the predetermined position can be detected by analyzing a photographed image. Accordingly, the predetermined position can be detected only by allowing the predetermined position to be visually recognizable. As a result, the distance between the movable portion and the predetermined position can be detected in a simple manner.

Application Example 6

In the above-described position control method, a required time in which the distance between the movable portion and the predetermined position becomes a predetermined distance is calculated, and in a case where the time elapses in the performing of control of allowing the movable portion to approach a predetermined position, the process transits from the performing of control of allowing the movable portion to approach a predetermined position to the performing of control of moving the movable portion to the predetermined position.

According to such a position control method, the time required for transition from the performing of control of allowing the movable portion to approach a predetermined position to the performing of control of moving the movable portion to the predetermined position is calculated. Then, when the calculated time elapses, the process transits from the performing of control of allowing the movable portion to approach a predetermined position to the performing of control of moving the movable portion to the predetermined position. In a case where the above-described method is not used, a method in which the location of the movable portion is detected by using a measurement device, and the process transits from the performing of control of allowing the movable portion to approach a predetermined position to the performing of control of moving the movable portion to the predetermined position in a case where the movable portion is positioned at a predetermined location may be used. When such a method is used, the measurement device is driven, whereby energy is consumed. The method in which the determination is made based on the elapsed time is a position control method capable of saving resources, compared to the case where a measurement device is used.

In the above-described position control method, the relative position of the movable portion with respect to the predetermined position is detected by imaging a mark from which relative position information with respect to the predetermined position can be acquired and analyzing an imaged image.

According to such a position control method, the imaging unit photographs a mark. When the imaging unit is disposed in the movable portion, the relative positions of the mark and the movable portion can be recognized by detecting the relative positions of the imaging unit and the mark. On the other hand, when the imaging unit is not disposed in the movable portion, the relative positions of the mark and the movable portion can be recognized by photographing the mark and the movable portion by using the imaging unit. The position of the location of the mark with respect to a predetermined position is known. Accordingly, by analyzing the location of the mark and the location of the movable portion, the location of the movable portion with respect to the predetermined position can be detected. As a result, even when the predetermined position cannot be photographed, the relative positions of the location of the movable portion and the predetermined position can be recognized by detecting the mark.

In the above-described position control method, the predetermined position is on a vertical line passing through a location at which a work is disposed, and the mark is disposed on the work.

According to such a position control method, a marker disposed in the work is used as the mark. Thus, by photographing the marker disposed in the work and moving the movable portion, the movable portion can be moved to the location at which the work is positioned. Even in a case where the work is not visually distinguished and it is difficult to recognize the shape of the work, the position of the work can be easily recognized by using the mark.

In the above-described position control method, the mark is formed so as to form a predetermined shape by irradiating light thereon.

According to such a position control method, the mark is formed by irradiating light thereon. Accordingly, the image of the mark in the image photographed when the mark is photographed becomes an image having high contrast. As a result, the image of the mark can be easily detected from the photographed image.

According to this application example of the invention, there is provided a position control method for controlling a position of a movable portion. The position control method includes: allowing the movable portion to approach a predetermined position by moving the movable portion and detecting an amount of movement of the movable portion; moving the movable portion to the predetermined position by moving the movable portion and detecting a relative position of the movable portion with respect to the predetermined position by using an imaging unit; and suppressing vibration of the movable portion based on movement of the movable portion that is detected by using an inertial sensor.

According to the above-described position control method, the amount of information on the movement amount that is detected in the performing of control of allowing the movable portion to approach a predetermined position is smaller than that of information on the location that is detected in the performing of control of moving the movable portion to the predetermined position. Accordingly, in the performing of control of allowing the movable portion to approach a predetermined position, calculation for the control process can be performed more quickly than in the performing of control of moving the movable portion to the predetermined position. Therefore, in the performing of control of allowing the movable portion to approach a predetermined position, a control process for moving the movable portion can be performed more quickly than in the performing of control of moving the movable portion to the predetermined position. In the performing of control of moving the movable portion to the predetermined position, the movable portion is controlled by detecting the location of the movable portion and the location of the target. Accordingly, the movable portion can be reliably moved to a predetermined position. In the suppressing of vibration of the movable portion, the movement of the movable portion is detected. In addition, by controlling the vibration of the movable portion to be suppressed based on the movement, unnecessary vibration of the movable portion is suppressed. Since the amplitude of vibration of the movable portion is small, the location of the movable portion can be easily detected. As a result, the location of the movable portion can be detected with high precision.

According to this application example of the invention, there is provided a robot including: a movable portion; an imaging unit that detects a relative position of the movable portion with respect to a predetermined position; a first movement control unit that performs control to allow the movable portion to approach the predetermined position; and a second movement control unit that performs control to move the movable portion to the predetermined position by using information on an image photographed by the imaging unit.

According to the above-described robot, the first movement control unit allows the movable portion to approach the predetermined position. The imaging unit detects the location at which the movable portion is positioned and outputs the information on the position of the movable portion to the second movement control unit. Then, the second movement control unit moves the movable portion to the predetermined position.

When the first movement control unit allows the movable portion to approach the predetermined position, the precision of the position is not required. Accordingly, the movable portion can be moved in a speedy manner. The second movement control unit controls the movable portion by using the information on the position of the movable portion that is detected by the imaging unit. Accordingly, the movable portion can be reliably moved to the predetermined position. Therefore, the position of the movable portion can be controlled with high precision.

In the above-described robot, the imaging unit is disposed in the movable portion.

According to such a robot, the imaging unit photographs the target location. Then, by analyzing an image photographed by the imaging unit, the relative positions of the imaging unit and the target location can be calculated. Since the imaging unit is disposed in the movable portion, the relative positions of the movable portion and the target location can be detected. As a result, the position of the target can be detected with high precision.

In the above-described robot, a range in which the movable portion is moved is included in a range photographed by the imaging unit.

According to such a robot, the imaging unit can reliably photograph the movable portion. Then, the relative positions of the movable portion, which is photographed in an image, and the imaging unit can be calculated by analyzing the image photographed by the imaging unit. Accordingly, the relative positions of the movable portion and the imaging unit can be detected.

The above-described robot, further includes a driving unit that drives the movable portion, and the driving unit includes a step motor.

The driving signal of the step motor is a pulse waveform, and the driving shaft of the step motor is rotated in correspondence with the number of waves of the pulse waveforms. Accordingly, the movement amount of the movable portion can be controlled by controlling the driving signal of the step motor. A rotary encoder is not necessary for the step motor. However, there are cases where a step-out phenomenon occurs in which the current rotation angle is lost. According to such a position control device, the movable portion can be moved to a predetermined position by using the step motor as the imaging unit detects the position of the movable portion after recovery from the step-out phenomenon. In addition, a rotary encoder is not necessary for the step motor. Accordingly, the configuration can be simplified.

DESCRIPTION OF EXEMPLARY EMBODIMENTS

Hereinafter, embodiments of the invention will be described with reference to the accompanying drawings. In order for size members to be recognizable in the drawings, the members are differently scaled.

First Embodiment

A robot according to this embodiment using a method of controlling the position of a robot hand as a characteristic will be described with reference to FIGS. 1A to 6B.

Figure 1B:
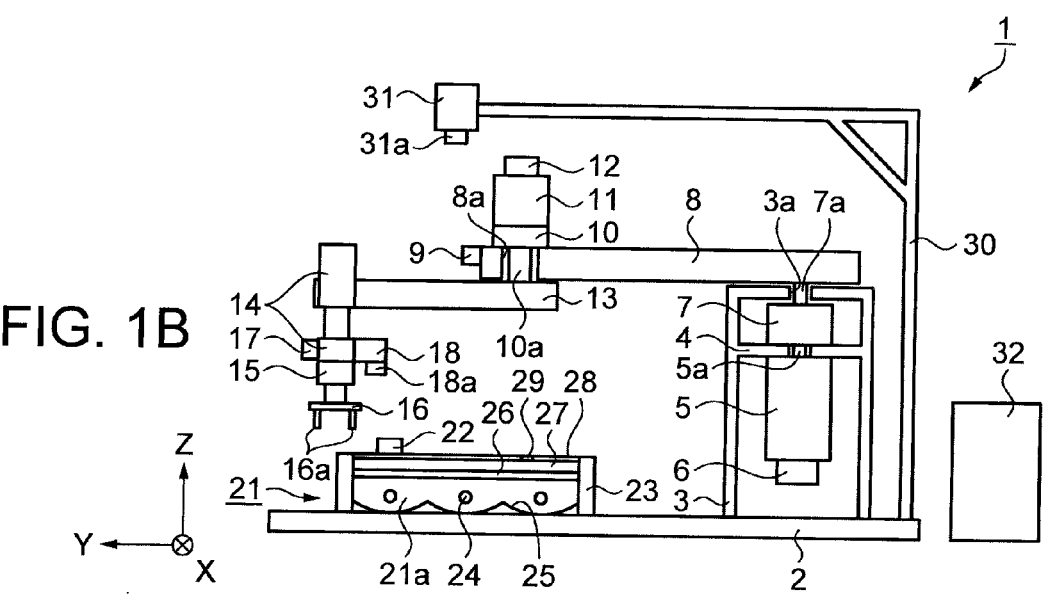
FIG. 1B is a schematic cross-sectional view showing the configuration of the robot.

FIG. 1A is a schematic perspective view showing the configuration of the robot. FIG. 1B is a schematic cross-sectional view showing the configuration of the robot. As shown in FIGS. 1A and 1B, the robot 1 includes a base 2 that is formed to have a flat plate shape. One direction on a horizontal surface of the base 2 is assumed to be the X direction. In addition, the direction opposite to the direction of gravity is assumed to be the Z direction, and the direction that is perpendicular to the X direction and the Z direction is assumed to be the Y direction.

On the base 2, a support bar 3 is disposed. Inside the support bar 3, a hollow space is formed. This hollow space is vertically divided by a support plate 4. On the lower side of the support plate 4, a first motor 5 as a driving unit is disposed. On the lower side of the first motor 5, a first angle detector 6 as a movement amount detecting unit is disposed. The first angle detector 6 is a device that detects the rotation angle of the first motor 5.

On the upper side of the support plate 4, a first decelerator 7 is disposed. A rotation shaft 5a of the first motor 5 is connected to an input shaft of the first decelerator 7. In addition, an output shaft 7a is disposed on the upper side of the first decelerator 7. Then, the output shaft 7a rotates at a rotation speed that is acquired by decreasing the rotation speed of the rotation shaft 5a of the first motor 5. As the first decelerator 7, any type of decelerator can be used. In this embodiment, for example, a Harmonic Drive (registered trademark) is used. On the surface of the support bar 3, a hole portion 3a is formed. The output shaft 7a is disposed so as to protrude from the hole portion 3a.

A first arm portion 8 having an approximately rectangular parallelepiped shape that is connected to the output shaft 7a is disposed, and the first arm portion 8 is rotated around the output shaft 7a. By rotating the first motor 5, the first arm portion 8 is rotated. Then, the first angle detector 6 detects the rotation angle of the first arm portion 8.

On the left side of the first arm portion 8 in FIG. 1B, a first angular velocity sensor 9 serving as a vibration detecting unit and an inertial sensor is disposed in the tip end of the first arm portion 8. When the first arm portion 8 is rotated, the angular velocity of the first arm portion 8 is detected by a first angular velocity sensor 9.

On the first arm portion 8, in a corner opposite to the first motor 5, a second decelerator 10, a second motor 11 as a driving unit, and a second angle detector 12 as a movement amount detecting unit are disposed in the above-mentioned order in an overlapping manner. In addition, an output shaft 10a of the second decelerator 10 is disposed in the downward direction in the figure. In the first arm portion 8, a hole portion 8a is formed in a location opposing the second decelerator 10. The output shaft 10a is disposed so as to protrude from the hole portion 8a.

To a rotation shaft of the second motor 11, the second angle detector 12 is connected. The second angle detector 12 detects the rotation angle of the rotation shaft of the second motor 11. In addition, the rotation shaft of the second motor 11 is connected to an input shaft of the second decelerator 10. The output shaft 10a of the second decelerator 10 is rotated at a rotation speed that is acquired by decelerating the rotation speed of the rotation shaft of the second motor 11.

The rotation directions of the first motor 5 and the second motor 11 may be controlled by using electrical signals. As the first motor 5 and the second motor 11, various types of motors such as DC motors, pulse motors, or AC motors can be used. In this embodiment, for example, the DC motors are used. The first angle detector 6 may be configured to detect the rotation angle of the driving shaft of the first motor 5, and the second angle detector 12 may be configured to detect the rotation angle of the driving shaft of the second motor 11. In the first angle detector 6 and the second angle detector 12, any type of rotary encoder such as a magnetic type or an optical type can be used. In this embodiment, for example, an optical-type rotary encoder is used.

A second arm portion 13 having an approximate rectangular parallelepiped shape is disposed so as to be connected to the output shaft 10a. The second arm portion 13 is rotated around the output shaft 10a. On the second arm portion 13, in a corner opposite to the second motor 11, an elevation device 14 is disposed. The elevation device 14 includes a direct acting mechanism and can be expanded or contracted by driving the direct acting mechanism.

On the lower side of the elevation device 14, a rotation device 15 as a movable portion is disposed. The rotation device 15 may be configured to control the rotation angle. The rotation device 15 can be configured by combining various motors and a rotation angle sensor. In addition, a step motor that can rotate such that the rotation angle becomes a predetermined angle can be used. In this embodiment, for example, a step motor is used.

On the lower side of the elevation device 14, a hand portion 16 as a movable portion is disposed. The hand portion 16 is connected to the rotation shaft of the rotation device 15. Accordingly, the robot 1 can rotate the hand portion 16 by driving the rotation device 15. In addition, the robot 1 can lift or lower the hand portion 16 by driving the elevation device 14.

The hand portion 16 has finger portions 16a as two movable portions having an approximately rectangular parallelepiped shape and a direct acting mechanism. The direct acting mechanism can change the gap between the two finger portions 16a. The hand portion 16 can hold the work by pinching it between the finger portions 16a. In the direct acting mechanisms of the elevation device 14 and the hand portion 16, any type of mechanisms such as an air cylinder, a linear motor, and a device acquired by combining a ball screw and a rotation motor can be used. In this embodiment, for example, a device acquired by combining a ball screw and a step motor is used in the direct acting mechanisms of the elevation device 14 and the hand portion 16.

On the rotation device 15 side of the left side of the elevation device 14 in FIG. 1B, a second angular velocity sensor 17 serving as a vibration detecting unit and an inertial sensor is disposed. The types of the first angular velocity sensor 9 and the second angular velocity sensor 17 are not particularly limited, and a gyroscope such as a rotary-type gyroscope, a vibration-type gyroscope, a gas-type gyroscope, or a ring laser gyroscope can be used. In this embodiment, for example, a vibrator-type gyroscope which is a vibration-type gyroscope is used.

In a place facing the second angular velocity sensor 17, a first imaging device 18 is disposed with the elevation device 14 pinched therebetween. An imaging lens 18a of the first imaging device 18 is disposed toward the lower side in the figure. Thus, the first imaging device 18 can photograph the lower side in the figure. Accordingly, the first imaging device 18 can photograph the hand portion 16 and a lower portion of the hand portion 16 in the figure. In addition, the first imaging device 18 has an auto focus function and can take an in-focus photograph of an object to be photographed. In addition, the imaging lens 18a includes a magnification changing mechanism so as to change the configuration of lenses.

On the base 2, in a place facing the second arm portion 13, a mounting stand 21 of a rectangular parallelepiped is disposed. On the mounting stand 21, the work 22 is placed, and the hand portion 16 can grip the work 22.

The mounting stand 21 has a hollow space 21a therein, and a frame 23 is disposed so as to surround the hollow space 21a. In the hollow space 21a inside the mounting stand 21, a cold-cathode tube 24 and a reflective plate 25 are disposed on the base 2 side. On one face of the reflective plate 25, a concave mirror is formed. The concave mirror reflects light emitted by the cold-cathode tube 24 to the upper side in the figure. In the hollow space 21a inside the mounting stand 21, a light diffusion plate 26, a transparent substrate 27, and a mask substrate 28 are disposed in an overlapping manner on the upper side in the figure.

The light diffusion plate 26 is an optical device that allows the distribution of light irradiated from the cold-cathode tube 24 and the reflective plate 25 to be uniform. For example, the light diffusion plate 26 is formed by disposing a white coating material in a predetermined pattern on a semi-transparent resin plate. In the light diffusion plate 26, the area ratio of a white coating material that is disposed in an area, in which the amount of irradiated light is large, is larger than that disposed in an area in which the amount of irradiated light is small.

Accordingly, in a place in which the amount of irradiated light is large, the light is diffused. Therefore, the distribution of the light becomes uniform.

The transparent substrate 27 is a structure that is used for supporting the weight of the work 22. The transparent substrate 27 may have light transparency. For example, as the transparent substrate 27, a glass plate or a resin plate can be used. The mask substrate 28 is a substrate that has a light shielding property. The mask substrate 28 is formed such that light is transmitted only through a portion of a mark 29 that is formed in a predetermined pattern. For example, a substrate acquired by forming holes having a predetermined pattern on a metal plate can be used as the mask substrate 28. In addition, a substrate having a predetermined pattern formed thereon by coating a resin substrate having light transparency with a coating material having a light shielding property can be used as the mask substrate 28.

The light irradiated by the cold-cathode tube 24 passes through the light diffusion plate 26, the transparent substrate 27, and the mask substrate 28 and travels to the upper side in the figure. When the first imaging device 18 is located in a position facing the mark 29, light having the shape of the mark 29 irradiates the first imaging device 18. Accordingly, when the first imaging device 18 photographs the mark 29, the mark 29 is photographed as a high-contrast image.

A support portion 30 is disposed on the base 2 in the X direction from the support bar 3, and a second imaging device 31 is disposed so as to be connected to the support portion 30. The second imaging device 31 is disposed in a location facing the mounting stand 21, and the imaging lens 31a is disposed on the mounting stand 21 side of the second imaging device 31. The second imaging device 31 can photograph the mark 29, the work 22, and the hand portion 16 that are located on the mounting stand 21. The range in which the hand portion 16 can be moved is included in the range that is photographed by the second imaging device 31. Accordingly, when the second imaging device 31 photographs the robot 1, the location at which the hand portion 16 is located can be detected.

On the right side of the support bar 3 in FIG. 1B, a control device 32 as a position control device is disposed. The control device 32 is a device that controls the operation of the robot 1 by controlling the first motor 5, the second motor 11, the elevation device 14, the hand portion 16, and the like.

Figure 2:
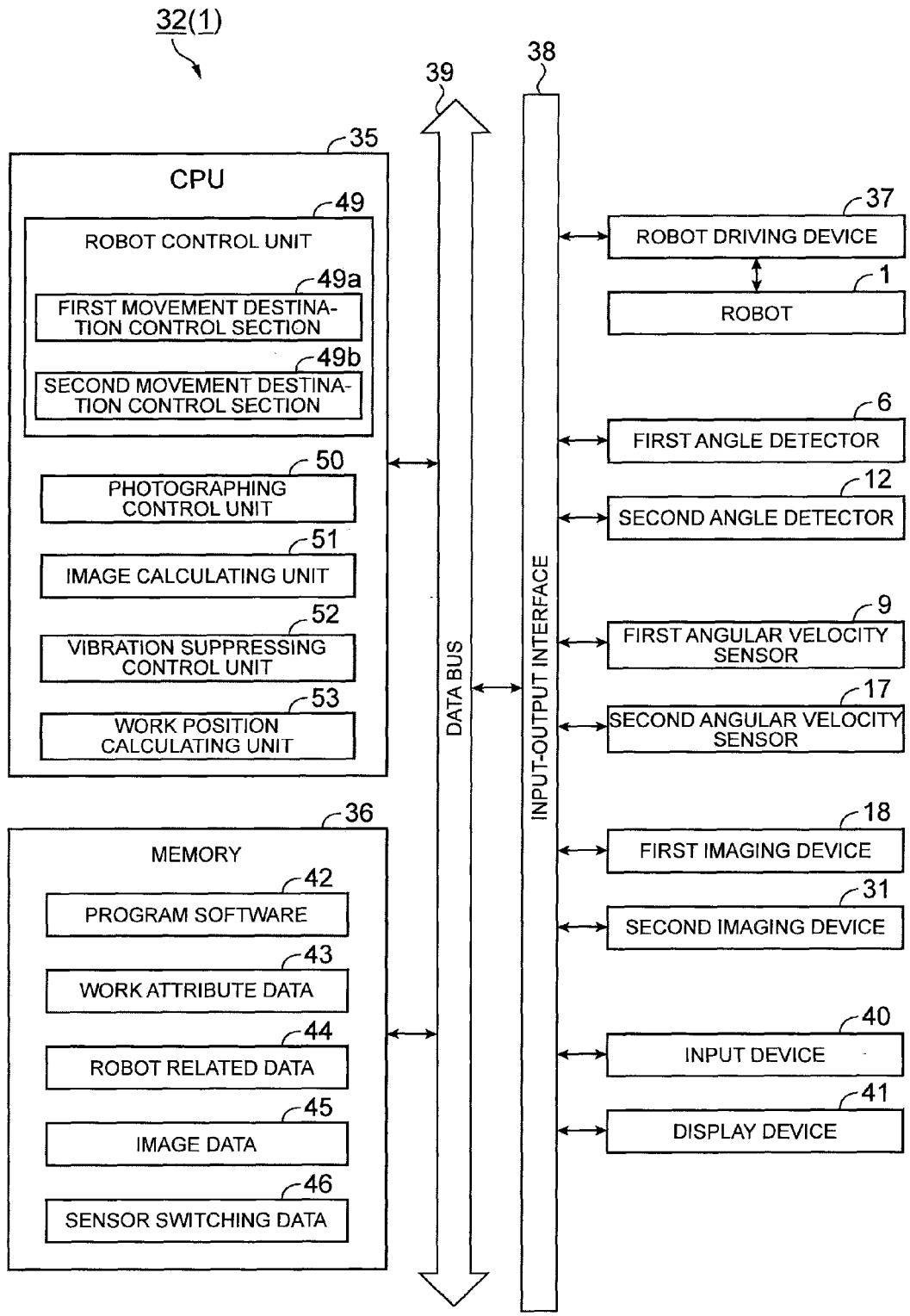
FIG. 2 is a block diagram showing electric control of the robot.

FIG. 2 is a block diagram showing the electric control of the robot. As shown in FIG. 2, the control device 32 as a control unit of the robot 1 includes a CPU (central processing unit) 35 that performs various calculation processes as a processor and a memory 36 that stores various types of information.

A robot driving device 37, the first angle detector 6, the second angle detector 12, the first angular velocity sensor 9, and the second angular velocity sensor 17 are connected to the CPU 35 through an input-output interface 38 and a data bus 39. In addition, the first imaging device 18, the second imaging device 31, an input device 40, and a display device 41 are connected to the CPU 35 through the input-output interface 38 and the data bus 39.

The robot driving device 37 is a device that is connected to the robot 1 so as to drive the robot 1. The robot driving device 37 drives actuators such as the first motor 5 and the second motor 11. When the CPU 35 directs the movement of the work 22, the robot driving device 37 grips and moves the work 22.

The first angle detector 6 detects the rotation angle of the first motor 5 and transmits angle information on the first motor 5 to the CPU 35. Similarly, the second angle detector 12 detects the rotation angle of the second motor 11 and transmits angle information on the second motor 11 to the CPU 35. The first angular velocity sensor 9 detects the angular velocity of the first arm portion 8 and transmits angular velocity information on the first arm portion 8 to the CPU 35. Similarly, the second angular velocity sensor 17 detects the rotational angular velocity of the elevation device 14 and transmits angular velocity information on the elevation device 14 to the CPU 35.

Each of the first imaging device 18 and the second imaging device 31 performs photographing in response to a direction signal of the CPU 35 and then outputs data of the photographed image to the memory 36. The input device 40 is a device that inputs various types of information such as information on the shape of the work 22 or the operating condition of the robot 1. For example, the input device 40 is a device that receives coordinates representing the shape of the work 22 from an external device not shown in the figure and inputs the coordinates. The display device 41 is a device that displays data or an operation status relating to the work 22 or the robot 1. An operator performs an input operation by using the input device 40 based on the information displayed in the display device 41.

The memory 36 includes a semiconductor memory such as a RAM or a ROM, a hard disk, or an external memory device called a DVD-ROM. From the viewpoint of functionality, a memory area for storing program software 42 in which the control procedure of the operation of the robot 1 is described is set in the memory 36. In addition, a memory area for storing work attribute data 43 that is information on the shape and the dimensions of the work 22, and the like is also set in the memory 36. A memory area for storing robot related data 44 that is information on constituent elements of the robot 1, conditions for driving each movable portion for a case where the work 22 is moved, or the like is also set in the memory 36. In addition, a memory area for storing image data 45 that is data of images photographed by the first imaging device 18 and the second imaging device 31 or data of an image after an image process is also set in the memory 36. A memory area for storing sensor switching data 46 that is data of conditions for switching between the angle sensors or the imaging devices is also set in the memory 36. Furthermore, a memory area serving as a work area or a temporary file for the CPU 35 or the like or other various memory areas are set in the memory 36.

The CPU 35 detects the position of the work 22 and then performs control for moving the work 22 to a predetermined location, in accordance with the program software 42 that is stored inside the memory 36. The CPU 35 includes a robot control unit 49 that performs control for moving the work 22 by driving the robot 1 as a concrete function implementing unit. The robot control unit 49 includes a first movement destination control section 49*a* and a second movement destination control section 49*b*. The first movement destination control section 49*a* controls movement of the hand portion 16 to a predetermined location by using signals that are output from the first angle detector 6 and the second angle detector 12. The second movement destination control section 49*b* controls movement of the hand portion 16 to a predetermined location by using signals that are output from the first imaging device 18 and the second imaging device 31. In addition, the CPU 35 includes a photographing control unit 50 that controls a photographing operation by outputting directions for photographing to the first imaging device 18 and the second imaging device 31. Furthermore, the CPU 35 includes an image calculating unit 51 that extracts an image corresponding to the work 22 or the mark 29 by eliminating noise from the image photographed by the imaging device.

In addition, the CPU 35 includes a vibration suppressing control unit 52 that controls the operation of the robot 1 such that the hand portion 16 cannot be easily vibrated in a case where the first and the second arm portions 8 and 13 of the robot 1 are moved or stopped. Furthermore, the CPU 35 includes a work position calculating unit 53 that detects the position of the work 22 by using a photographed image.

Figure 3:
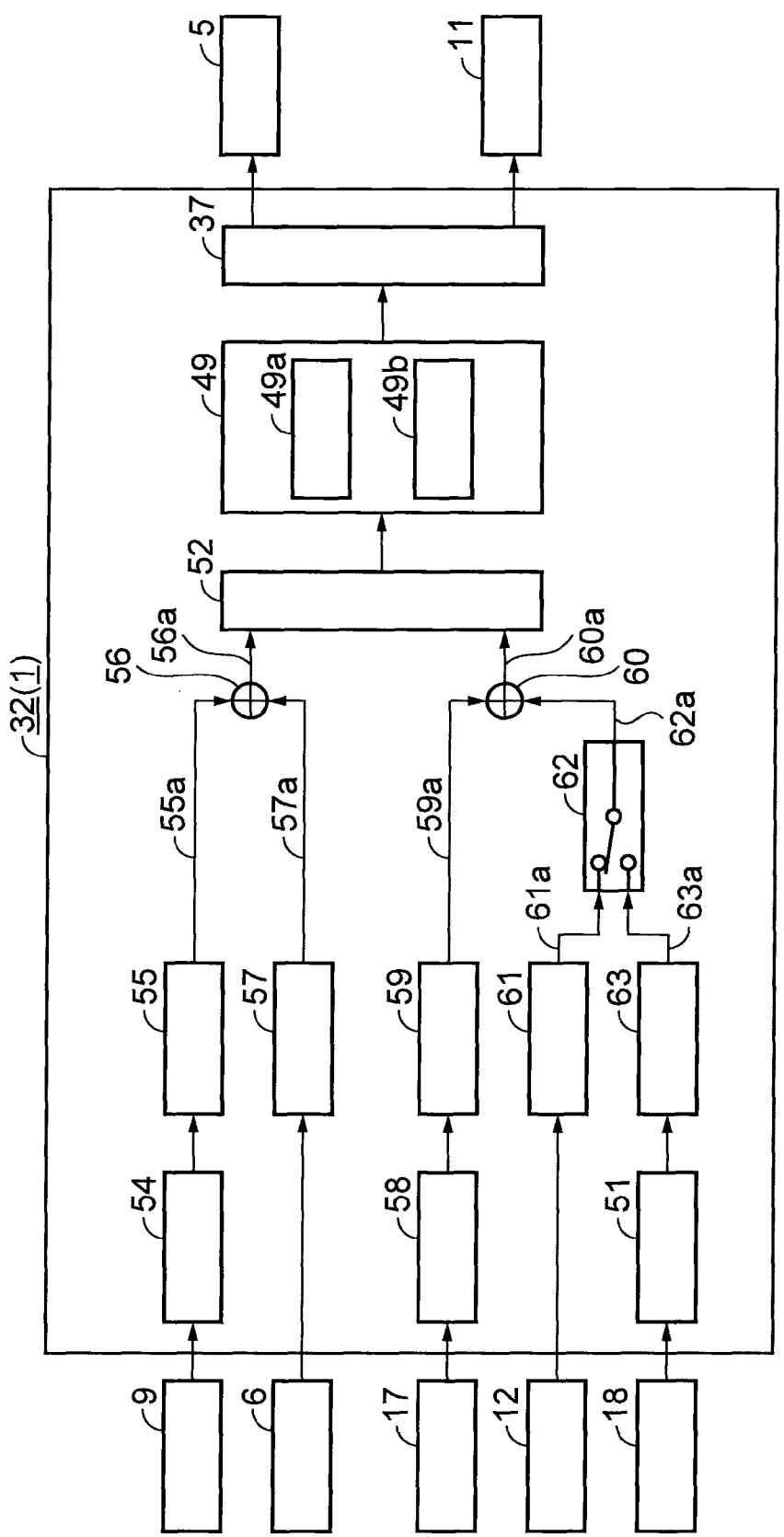
FIG. 3 is a block diagram of electric control showing the flow of signals.

FIG. 3 is a block diagram of electric control showing the flow of signals. As shown in FIG. 3, signals are output from the first angular velocity sensor 9 and the first angle detector 6 that detect the operation of the first arm portion 8 to the control device 32. An angular velocity signal that is output by the first angular velocity sensor 9 is input to a first integration calculating unit 54. The first integration calculating unit 54 calculates an angle signal by calculating time integration of the input angular velocity signal. Next, the first integration calculating unit 54 outputs the calculated angle signal to a first high-frequency filter operating unit 55. The first high-frequency filter operating unit 55 receives the angle signal as input and performs an operation of extracting the high-frequency component of the angle signal. In other words, the first high-frequency filter operating unit 55 performs an operation of attenuating the low-frequency component of the angle signal. Then, the first high-frequency filter operating unit 55 outputs a first high-frequency signal 55*a* that is acquired by extracting the high-frequency component to a first addition unit 56.

The angle signal that is output by the first angle detector 6 is input to a first low-frequency filter operating unit 57. The first low-frequency filter operating unit 57 receives the angle signal as input and performs an operation of extracting the low-frequency component of the angle signal. In other words, the first low-frequency filter operating unit 57 performs an operation of attenuating the high-frequency component of the angle signal. Then, the first low-frequency filter operating unit 57 outputs a first low-frequency signal 57*a* acquired by extracting the low-frequency component to the first addition unit 56. The first addition unit 56 forms a first angle signal 56*a* by composing the first high-frequency signal 55*a* and the first low-frequency signal 57*a*. The first angle signal 56*a* is a signal that is formed by the low-frequency component of the signal output by the first angle detector 6 and the high-frequency component of the signal output by the first angular velocity sensor 9. In other words, the first angle signal 56*a* is a signal corresponding to the angle of the first arm portion 8. Then, the first addition unit 56 outputs the first angle signal 56*a* to the vibration suppressing control unit 52.

Signals are output to the control device 32 from the second angular velocity sensor 17 and the second angle detector 12, which detect the operation of the second arm portion 13, and the first imaging device 18. An angular velocity signal that is output by the second angular velocity sensor 17 is input to a second integration calculating unit 58. The second integration calculating unit 58 calculates an angle signal by calculating time integration of the input angular velocity signal. Next, the second integration calculating unit 58 outputs the calculated angle signal to a second high-frequency filter operating unit 59. The second high-frequency filter operating unit 59 receives the angle signal as input and performs an operation of extracting the high-frequency component of the angle signal. In other words, the second high-frequency filter operating unit 59 performs an operation of attenuating the low-frequency component of the angle signal. Then, the second high-frequency filter operating unit 59 outputs a second high-frequency signal 59*a* that is acquired by extracting the high-frequency component from the angle signal to a second addition unit 60.

The angle signal that is output by the second angle detector 12 is input to a second low-frequency filter operating unit 61. The second low-frequency filter operating unit 61 receives the angle signal as input and performs an operation of extracting the low-frequency component of the angle signal. In other words, the second low-frequency filter operating unit 61 performs an operation of attenuating the high-frequency component of the angle signal. Then, the second low-frequency filter operating unit 61 outputs a low-frequency angle signal 61a, which is acquired by extracting the low-frequency component, to a switching unit 62.

Image information output by the first imaging device is input to an image calculating unit 51. The image calculating unit 51 calculates position information of the first imaging device 18 by using the image information. In particular, the image calculating unit 51 extracts an image of a target mark 29 or the like and detects the position of the mark 29 or the like on the image. Then, the image calculating unit 51 calculates the position information of the mark 29 or the like with respect to the first imaging device 18 based on the position information of the image. The image calculating unit 51 outputs the calculated position information to a third low-frequency filter operating unit 63. The third low-frequency filter operating unit 63 receives the position information as input and performs an operation of extracting the low-frequency component of the transition of change in the position information. In other words, the third low-frequency filter operating unit 63 performs an operation of attenuating the high-frequency component of the shift of the change in the position information. Then, the third low-frequency filter operating unit 63 outputs low-frequency position information 63a that is acquired by extracting the low-frequency component from the change in the position information to the switching unit 62.

The switching unit 62 is connected to the second addition unit 60. Then, the switching unit 62 outputs one of the low-frequency angle signal 61a and the low-frequency position information 63a to the second addition unit 60 in accordance with the direction signal output by the CPU 35. The signal that is output to the second addition unit 60 by the switching unit 62 is referred to as a second low-frequency signal 62a.

The second addition unit 60 forms a second angle signal 60a by composing the second high-frequency signal 59a and the second low-frequency signal 62a. The second angle signal 60a is a signal that is formed by the angle signal of the second angle detector 12 or the low-frequency component of the position signal output by the first imaging device 18 and the high-frequency component of the signal output by the second angular velocity sensor 17. In other words, the second angle signal 60a is a signal corresponding to the angle or the posture of the second arm portion 13. The second addition unit 60 outputs the second angle signal 60a to the vibration suppressing control unit 52.

The vibration suppressing control unit 52 receives the first angle signal 56a as input and calculates a control signal for suppressing the vibration of the first arm portion 8. In particular, the first motor 5 is driven such that generation of vibration of the first arm portion 8 is suppressed as much as possible and the overall operation of the first arm portion 8 is close to a desired movement, based on the first angle signal 56a. For example, the first motor 5 is driven such that the vibration of the phase that is opposite to the phase of vibration of the first arm portion 8 is added. Then, the vibration of the first arm portion 8 and the vibration that has been newly added are controlled to offset each other.

In addition, the vibration suppressing control unit 52 receives the first angle signal 56a and the second angle signal 60a as input and calculates a control signal for suppressing the vibration of the second arm portion 13. In particular, the first motor 5 and the second motor 11 are driven such that generation of vibration of the second arm portion 13 is suppressed as much as possible and the overall operation of the second arm portion 13 is close to a desired movement. For example, the first motor 5 and the second motor 11 are driven such that the vibration having the phase that is opposite to the phase of vibration of the second arm portion 13 is added. Then, the vibration of the second arm portion 13 and the vibration that has been newly added are controlled to offset each other.

The vibration suppressing control unit 52 outputs the calculated control signal, the first angle signal 56a, and the second angle signal 60a to the robot control unit 49. An operation that is controlled by the first movement destination control section 49a is performed when the switching unit 62 outputs the low-frequency angle signal 61a on the basis of the output of the second angle detector 12 as the second low-frequency signal 62a. Then, an operation that is controlled by the second movement destination control section 49b is performed when the switching unit 62 outputs the low-frequency position information 63a on the basis of the output of the first imaging device 18 as the second low-frequency signal 62a. The robot control unit 49 calculates a difference between the position of the hand portion 16 and the movement destination location. Then, a control signal that is formed based on the shifts of changes in the parameters of the angles and the angular velocity at which the first motor 5 and the second motor 11 are driven and the like is calculated. Then, the robot control unit 49 outputs the control signal to the robot driving device 37. The robot driving device 37 receives the control signal as input and outputs driving signals to the first motor 5 and the second motor 11. The first arm portion 8 and the second arm portion 13 are operated by rotating the first motor 5 and the second motor 11 in response to the driving signals.

Method of Controlling Robot

Figure 4:
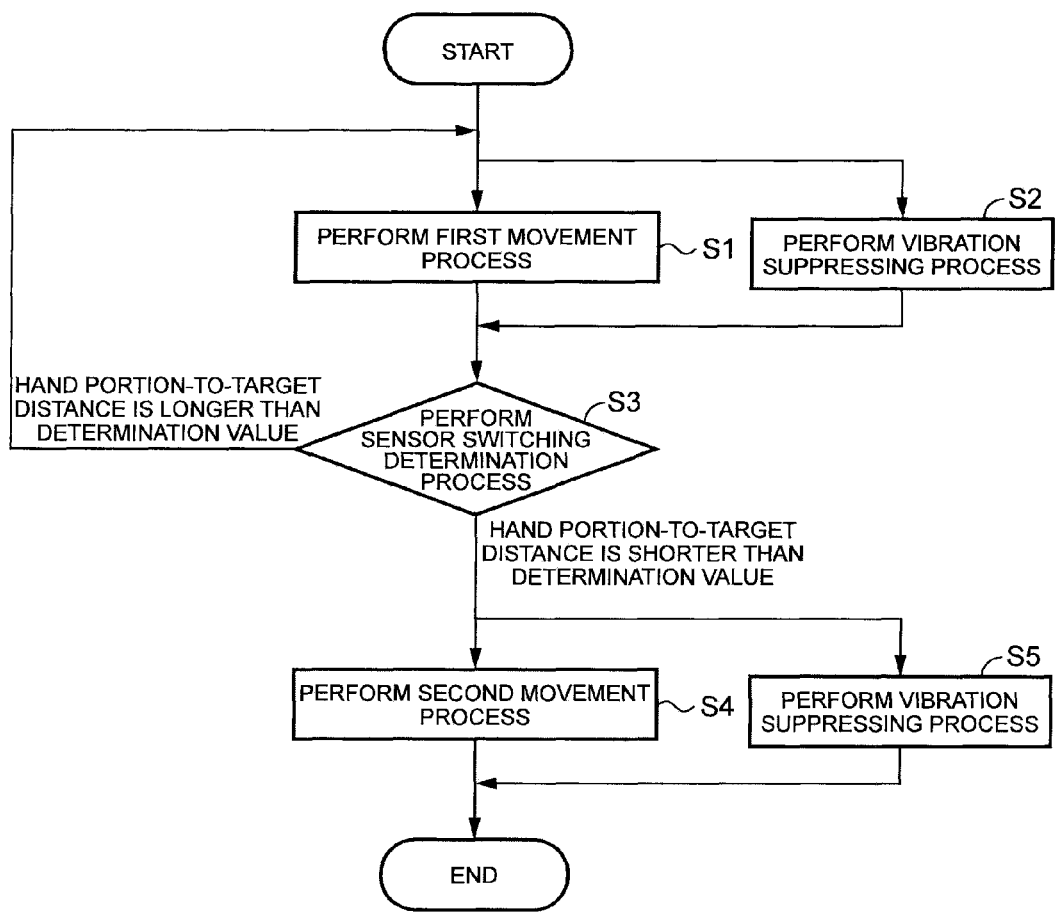
FIG. 4 is a flowchart representing the operation of moving a hand portion.

Next, a position control method for moving the hand portion 16 of the above-described robot 1 to a predetermined position will be described with reference to FIGS. 4, 5A to 5C, and 6A and 6B. The description will be presented by using an example of an operation in which the control device 32 moves the hand portion 16 from a standby location to a location facing the work 22. FIG. 4 is a flowchart representing the operation of moving the hand portion 16. FIGS. 5A to 5C and FIGS. 6A and 6B are schematic diagrams illustrating a robot control method in the operation of moving the hand portion 16.

In the flowchart shown in FIG. 4, Step S1 corresponds to a first movement process. This process is a process in which the amount of movement of the hand portion is detected by using the first angle detector and the second angle detector, and the hand portion is allowed to approach a target location as a predetermined position. Next, the process proceeds to Step S3. In parallel with Step S1, the process of Step S2 is performed. Step S2 corresponds to a vibration suppressing process. This process is a process in which the movement of the hand portion is detected by using the angular velocity sensor, and the vibration is suppressed. Next, the process proceeds to Step S3. Step S3 corresponds to a sensor switching determination process. This process is a process for determining which one of the angle sensor and the imaging device will be used for detecting the position of the hand portion. When a distance between the hand portion and the target is longer than a determination value, the angle sensor is assumed to be used. Then, the process proceeds to Step S1 and Step S2. On the other hand, when the distance between the hand portion and the target is shorter than the determination value, the imaging device is assumed to be used. Then, the process proceeds to Step S4 and Step S5.

Step S4 corresponds to a second movement process. This process is a process in which the position of the hand portion is detected by using the first imaging device, and the hand portion is moved to a target location. In parallel with Step S4, the process of Step S5 is performed. Step S5 corresponds to a vibration suppressing process. This process is a process in which the movement of the hand portion is detected by using the angular velocity sensor, and control for suppressing the vibration is performed. When Step S4 and Step S5 are completed, the operation for moving the hand portion is completed.

Figure 5A:
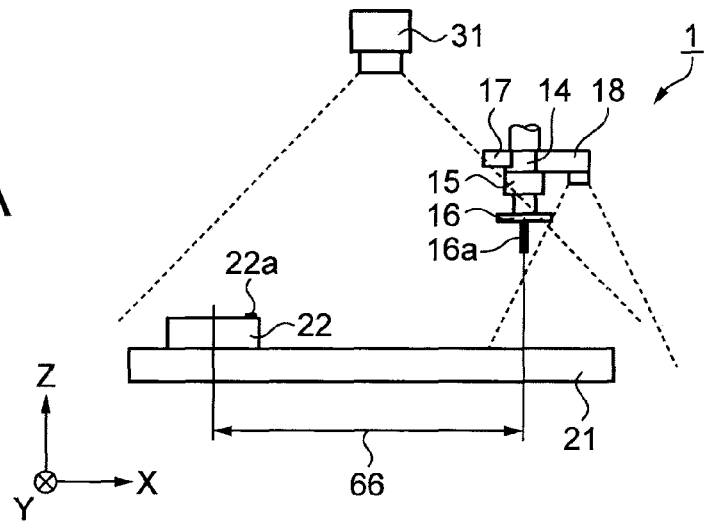
FIGS. 5A to 5C are schematic diagrams illustrating a robot control method in the operation of moving the hand portion.

Next, a position control method of the robot in the operation of moving the hand portion will be described in detail in correspondence with steps shown in FIG. 4, with reference to FIGS. 5A to 5C and 6A and 6B. FIG. 5A is a diagram corresponding to the first movement process of Step S1 and the vibration suppressing process of Step S2. As shown in FIG. 5A, in Step S1 and Step S2, the hand portion 16 is positioned at a standby location that is far from the work 22. The target location to which the hand portion 16 is to be moved is assumed to be the center of the work 22. In addition, a distance between the center line of the hand portion 16 and the center line of the work 22 is assumed to be a hand portion-to-target distance 66. The first movement destination control section 49a moves the hand portion 16 toward the work 22 by driving the robot 1. Next, the first movement destination control section 49a calculates the amount of movement of the hand portion 16 by using the output of the first angle detector 6 and the output of the second angle detector 12. Then, the hand portion 16 is controlled to be moved toward the center of the work 22.

In parallel with the movement of the hand portion 16, the vibration suppressing control unit 52 receives a signal corresponding to the vibration of the hand portion 16 that is detected by the second angular velocity sensor 17. Then, the vibration suppressing control unit 52 suppresses the vibration of the hand portion 16 by driving the robot 1. While the hand portion 16 is moved, the second imaging device 31 photographs the hand portion 16 and the work 22. Then, the image calculating unit 51 calculates the hand portion-to-target distance 66 based on the photographed image.

Figure 5B:
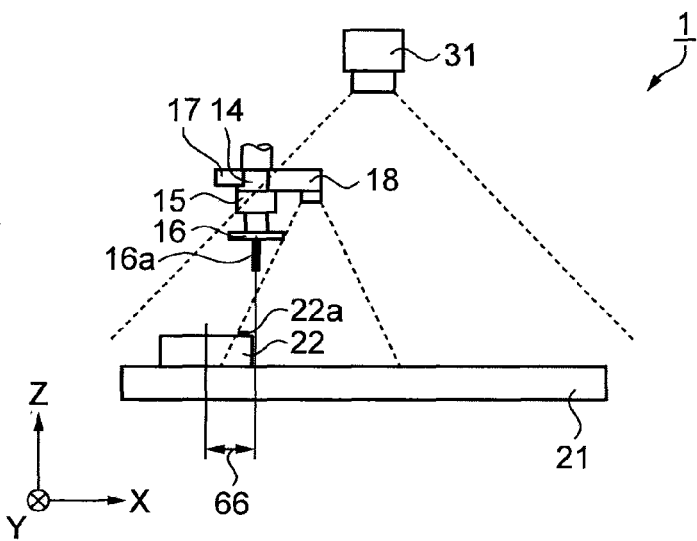

FIG. 5B is a diagram corresponding to the sensor switching determination process of Step S3. As shown in FIG. 5B, the hand portion 16 approaches the work 22. Then, the second imaging device 31 detects the hand portion-to-target distance 66. The CPU 35 compares the hand portion-to-target distance 66 with the determination value. When the hand portion-to-target distance 66 becomes a predetermined distance, the CPU 35 determines to proceed to the second movement process of Step S4.

Figure 5C:
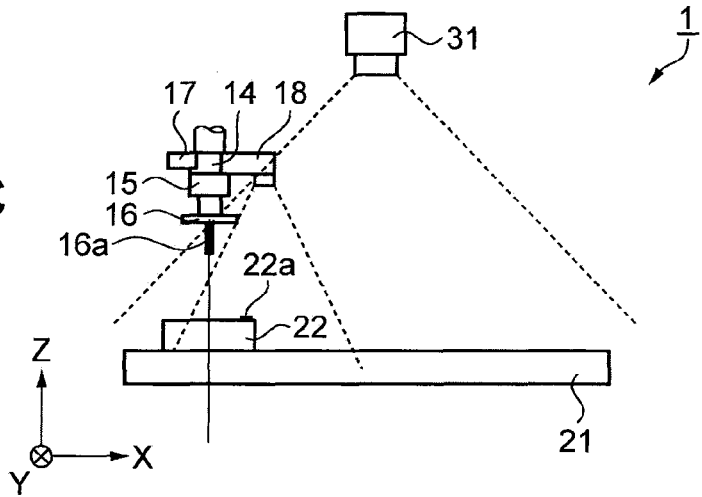
Figure 6A:
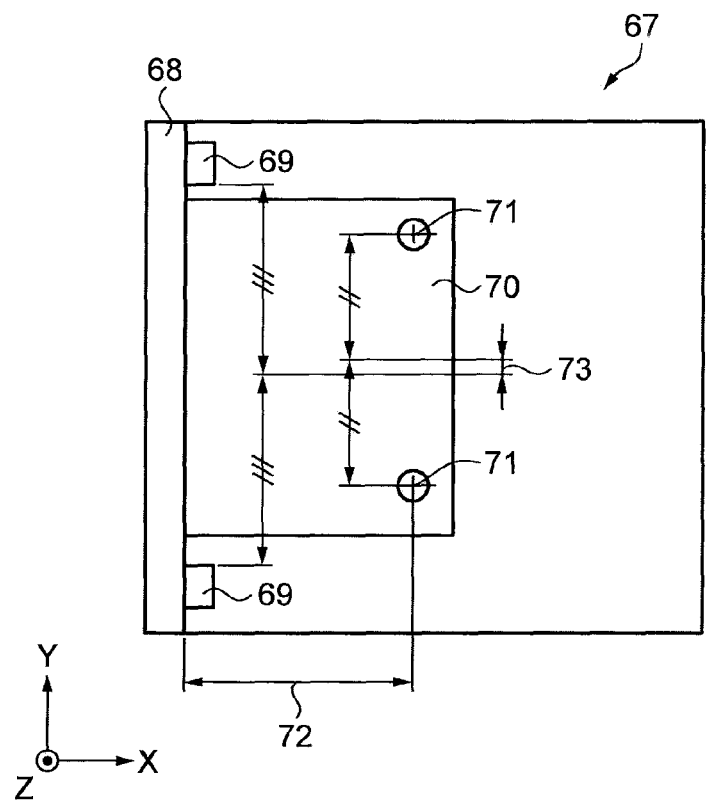
FIGS. 6A and 6B are schematic diagrams illustrating a robot control method in the operation of moving the hand portion.

FIGS. 5C and 6A are diagrams corresponding to the second movement process of Step S4 and the vibration suppressing process of Step S5. As shown in FIG. 5C, in Step S4, the second movement destination control section 49b moves the center of the hand portion 16 to the center of the work 22. On a face of the work 22 that is located on the first imaging device 18 side, a position detection mark 22a is disposed. Then, the first imaging device 18 photographs the hand portion 16, the finger portion 16a, and the position detection mark 22a of the work 22.

FIG. 6A represents an image that is photographed by the first imaging device 18. In the image 67, a hand portion image 68, finger portion images 69, a work image 70, and position detection mark images 71 corresponding to the hand portion 16, the finger portions 16a, the work 22, and the position detection marks 22a are photographed. The image calculating unit 51 calculates a distance 72 in the X direction between the end of the hand portion image 68 and the center of the position detection mark image 71. In addition, the image calculating unit 51 calculates a distance 73 in the Y direction between the center point of the two finger portion images 69 and the center point of the two position detection mark images 71. Then, the work position calculating unit 53 calculates the relative positions of the hand portion 16 and the work 22 by using the information on the distance 72 and the distance 73. The second movement destination control section 49b moves the center of the finger portions 16a to the center of the work 22. At this time, the control device 32 repeatedly performs photographing by using the first imaging device 18, calculation of the relative positions of the hand portion 16 and the work 22, and movement of the hand portion 16.

Figure 6B:
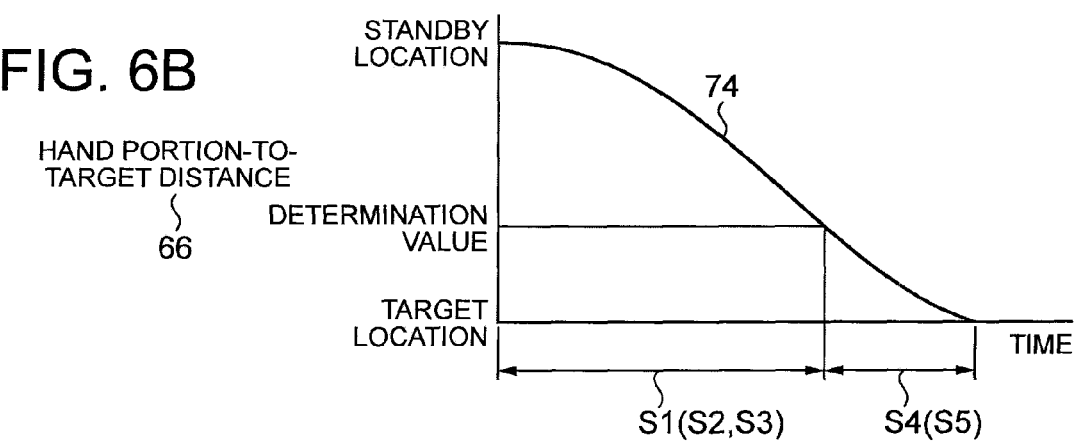

FIG. 6B represents a timing chart of movement of the hand portion to the target location. The vertical axis represents the hand portion-to-target distance 66 that is the distance between the hand portion 16 and the center of the work 22 as the target location. In the vertical axis, the upper side represents a location that is separated farther from the target location than the lower side. The horizontal axis represents the passing of time, and time progresses from the left side to the right side. A transition line 74 of the position of the hand portion represents progress of the movement of the hand portion 16 from the standby location to the target location. First, the hand portion 16 is positioned at the standby location. Then, by repeatedly performing Steps S1, S2, and S3, the control device 32 allows the hand portion 16 to approach the target location while suppressing the vibration of the hand portion 16. At this time, the switching unit 62 outputs the low-frequency angle signal 61a as the second low-frequency signal 62a. Then, the first movement destination control section 49a controls movement of the hand portion 16 by using the outputs of the first angle detector 6 and the second angle detector 12.

In addition, the robot control unit 49 calculates the hand portion-to-target distance 66 by using the information on the location of the hand portion 16 that is detected by the second imaging device 31. Then, when the hand portion-to-target distance 66 is shorter than the determination value set in advance, the second movement destination control section 49b of the robot control unit 49 controls the robot 1. Then, the process proceeds to Steps S4 and S5.

Then, by repeatedly performing Steps S4 and S5, the control device 32 allows the hand portion 16 to approach the target location while suppressing the vibration of the hand portion 16. At this time, the switching unit 62 outputs the low-frequency position information 63a as the second low-frequency signal 62a. Then, the second movement destination control section 49b controls movement of the hand portion 16 by using the outputs of the first angle detector 6 and the first imaging device 18. As a result, the hand portion 16 arrives at the center of the work 22 as the target location, and the operation of moving the hand portion is completed.

As described above, according to this embodiment, the following advantages are acquired.

(1) According to this embodiment, in the first movement process of Step S1, the amount of movement of the hand portion 16 is detected based on the outputs of the first angle detector 6 and the second angle detector 12, and the amount of movement of the hand portion 16 is controlled. Then, in the second movement process of Step S4, the location of the hand portion 16 is detected by using the output of the first imaging device 18, and the location of the hand portion 16 is controlled. The amount of information on the movement amount that is detected in the first movement process is smaller than that of the information on the location that is detected in the second movement process. Accordingly, in the first movement process, calculation for the control process can be performed more quickly than in the second movement process. Therefore, in the first movement process, the control process for moving the hand portion 16 can be performed more quickly than in the second movement process. In addition, in the first movement process, the amount of calculation for the control process is small, whereby the power consumption can be decreased. In the second movement process, the hand portion 16 is controlled by detecting the location of the hand portion 16 and the target location. Therefore, the hand portion 16 can be reliably moved to the target location with high precision.

(2) According to this embodiment, in the vibration suppressing processes of Step S2 and Step S5, the vibrations of the first arm portion 8 and the elevation device 14 are detected. Then, by vibrating the movable portion at the phase that is opposite to those of vibrations of the first arm portion 8 and the elevation device 14, the vibrations of the first arm portion 8 and the elevation device 14 are suppressed. When the vibration suppressing processes of Step S2 and Step S5 are performed in parallel with the first movement process of Step S1 and the second movement process of Step S4, the first arm portion 8 and the elevation device 14 can be moved with the vibrations thereof being suppressed. When the amplitudes of vibrations of the first arm portion 8 and the elevation device 14 are decreased in the first movement process, the amplitudes of vibrations of the first arm portion 8 and the elevation device 14 can be decreased at the time of proceeding to the second movement process. Accordingly, also in a stage proceeding to the second movement process, the amplitudes of vibrations of the first arm portion 8 and the elevation device 14 can be decreased. Even when the vibration suppressing process is performed in parallel with the second movement process, the amplitudes of vibrations of the first arm portion 8 and the elevation device 14 can be decreased. Since the amplitudes of vibrations of the first arm portion 8 and the elevation device 14 are decreased, the location of the hand portion 16 can be easily detected by using the first imaging device 18. As a result, the location of the hand portion 16 can be detected with high precision.

(3) According to this embodiment, the locations of the hand portion 16 and the position detection mark 22a are detected by the first imaging device 18. By selecting the magnification of the imaging lens 18a using the first imaging device 18, the resolution of detection of the locations of the hand portion 16 and the position detection mark 22a can be increased. Accordingly, the locations of the hand portion 16 and the position detection mark 22a can be detected with high precision. Thus, even when the arm is deformed, the hand portion 16 can be moved to a desired position with high precision based on the actual image information.

(4) According to this embodiment, the first imaging device 18 photographs the hand portion 16 and the position detection mark 22a. The image calculating unit 51 analyses the photographed image 67, whereby a distance between the center of the hand portion 16 and the center of the work 22 can be detected. Accordingly, the distance between the center of the hand portion 16 and the center of the work 22 can be detected by allowing the target location to be visually recognized by the position detection mark 22a. As a result, the distance between the center of the hand portion 16 and the center of the work 22 can be detected in a simple manner.

(5) According to this embodiment, the first imaging device 18 photographs the position detection mark 22a. Since the first imaging device 18 is disposed in the elevation device 14, the relative positions of the first imaging device 18 and the hand portion 16 are known. By calculating the relative positions of the first imaging device 18 and the position detection mark 22a by using the image 67 photographed by the first imaging device 18, the relative positions of the position detection mark 22a and the hand portion 16 can be recognized. Accordingly, even in a case where the first imaging device 18 cannot photograph the hand portion 16, the relative positions of the position detection mark 22a and the hand portion 16 can be recognized.

(6) According to this embodiment, the first imaging device 18 photographs the hand portion 16 and the position detection mark 22a within one image 67. Accordingly, by analyzing the photographed image, the relative positions of the hand portion 16 and the position detection mark 22a can be detected.

(7) According to this embodiment, the target location is detected by using the position detection mark 22a that is disposed on the work 22. By photographing the position detection mark 22a disposed on the work 22 and moving the hand portion 16, the hand portion 16 can be moved to a location at which the work 22 is positioned. Even when the contrast of the external appearance or the color tone of the work 22 is low with respect to the mounting stand 21, a position detection mark 22a can be detected without difficulty by disposing the position detection mark 22a having high contrast.

(8) According to this embodiment, the first movement destination control section 49a drives the second arm portion 13 by referring to the output of the second angle detector 12. In addition, the second movement destination control section 49b drives the second arm portion 13 by referring to the calculation result of the image calculating unit 51 that is calculated based on the output of the first imaging device 18.

The amount of information of the rotation angle detected by the second angle detector 12 is smaller than that of information of the location detected by the first imaging device 18. Accordingly, the first movement destination control section 49a can perform calculation for the control process more quickly than the second movement destination control section 49b. Therefore, the first movement destination control section 49a can control the movement of the second arm portion 13 more quickly than the second movement destination control section 49b.

The second movement destination control section 49b controls the hand portion 16 by detecting the location of the hand portion 16. Accordingly, the hand portion 16 can be reliably moved to the target location. The second angular velocity sensor 17 detects the vibration of the elevation device 14. Then, the vibration suppressing control unit 52 performs control to suppress the vibration based on the movement of the elevation device 14, whereby the vibration of the elevation device 14 is suppressed. Since the amplitude of vibration of the elevation device 14 is small, the image calculating unit 51 can detect the location of the hand portion 16 without difficulty. Accordingly, the location of the hand portion 16 can be detected with high precision, whereby the position of the hand portion 16 can be controlled with high precision.

(9) According to this embodiment, the first imaging device 18 photographs the hand portion 16. When the hand portion 16 approaches the work 22, the first imaging device 18 can photograph the hand portion 16 and the work 22. Then, by analyzing the image 67 that is photographed by the first imaging device 18, the image calculating unit 51 can calculate the relative positions of the hand portion 16 and the work 22 that are photographed in an image. Accordingly, the control device 32 can detect the relative positions of the hand portion 16 and the work 22.

(10) According to this embodiment, the second imaging device 31 can photograph the hand portion 16. Then, the image calculating unit 51 analyzes the photographed image, whereby the relative positions of the hand portion 16 and the second imaging device 31 that are photographed in an image can be calculated. The location at which the second imaging device 31 of the robot 1 is disposed is known information. Accordingly, the control device 32 can detect the position of the hand portion 16.

(11) According to this embodiment, the robot control unit 49 can control the position of the hand portion 16 with high precision. Therefore, the robot 1 can be operated with high quality.

(12) According to this embodiment, the vibration suppressing control unit 52 suppresses the vibration of the elevation device 14. Therefore, a time required for the vibrations of the elevation device 14 and the hand portion 16 to stop can be shortened.

Second Embodiment

Next, a robot according to an embodiment will be described with reference to FIG. 7. A difference between this embodiment and the first embodiment is that an elapsed time is used for the determination in the sensor switching determination process of Step S3 in this embodiment. Thus, the description of the same points as those of the first embodiment will be omitted, and only different points will be described. Other points are the same as those of the first embodiment.

Figure 7:
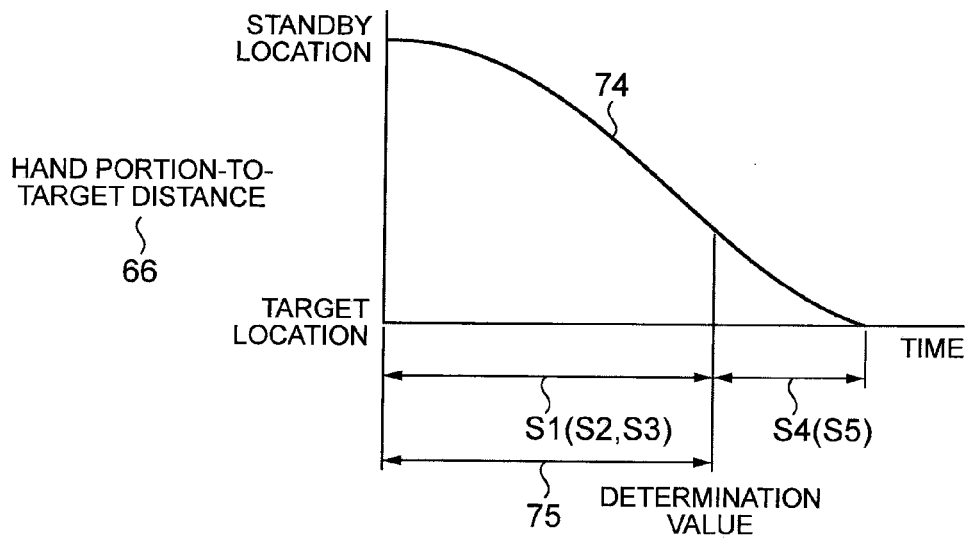
FIG. 7 is a timing chart representing the transition of moving a hand portion to a target location according to a second embodiment of the invention.

FIG. 7 is a timing chart representing the transition of moving the hand portion to the target location. The vertical axis represents the hand portion-to-target distance 66 that is a distance between the hand portion 16 and the center of the work 22 as the target location. In the vertical axis, the upper side represents a location that is separated farther from the target location than the lower side. The horizontal axis represents the passing of time, and time progresses from the left side to the right side. A transition line 74 of the hand portion position represents progress of the movement of the hand portion 16 from the standby location to the target location. First, the hand portion 16 is positioned at the standby location. Then, by repeatedly performing Steps S1, S2, and S3, the control device 32 allows the hand portion 16 to approach the target location while suppressing the vibration of the hand portion 16. At this time, the first movement destination control section 49a controls movement of the hand portion 16 by using the outputs of the first angle detector 6 and the second angle detector 12.

Before driving the robot 1, the robot control unit 49 calculates a time required for the hand portion 16 to approach the work 22 within a predetermined distance. Then, the robot control unit 49 sets the time as the determination value. Next, the control device 32 measures an elapsed time 75 after the start of the driving of the robot 1 in the first movement process of Step S1. Then, when the elapsed time 75 becomes the determination value, the control device 32 switches the control of the robot 1 from the first movement destination control section 49a to the second movement destination control section 49b. Then, the process proceeds from the first movement process of Step S1 to the second movement process of Step S4.

As described above, according to this embodiment, the following advantages are acquired.

(1) According to this embodiment, when the elapsed time 75 becomes the time of the determination value, the process proceeds from the first movement process of Step S1 to the second movement process of Step S4. There is a method in which the location of the hand portion 16 is detected by using a measurement device, and the process proceeds from the first movement process to the second movement process in a case where the hand portion 16 is positioned at a predetermined location. When such a method is used, the measurement device is driven, whereby energy is consumed. According to the method of this embodiment, compared to a case where the above-described measurement device is used, the robot 1 can be controlled with the resources being saved.

Third Embodiment

Next, a robot according to an embodiment will be described with reference to FIG. 8. A difference between this embodiment and the first embodiment is that the position of the hand portion 16 is detected by using a position detection sensor instead of the second imaging device 31. Thus, the description of the same points as those of the first embodiment will be omitted, and only different points will be described. Other points are the same as those of the first embodiment.

Figure 8:
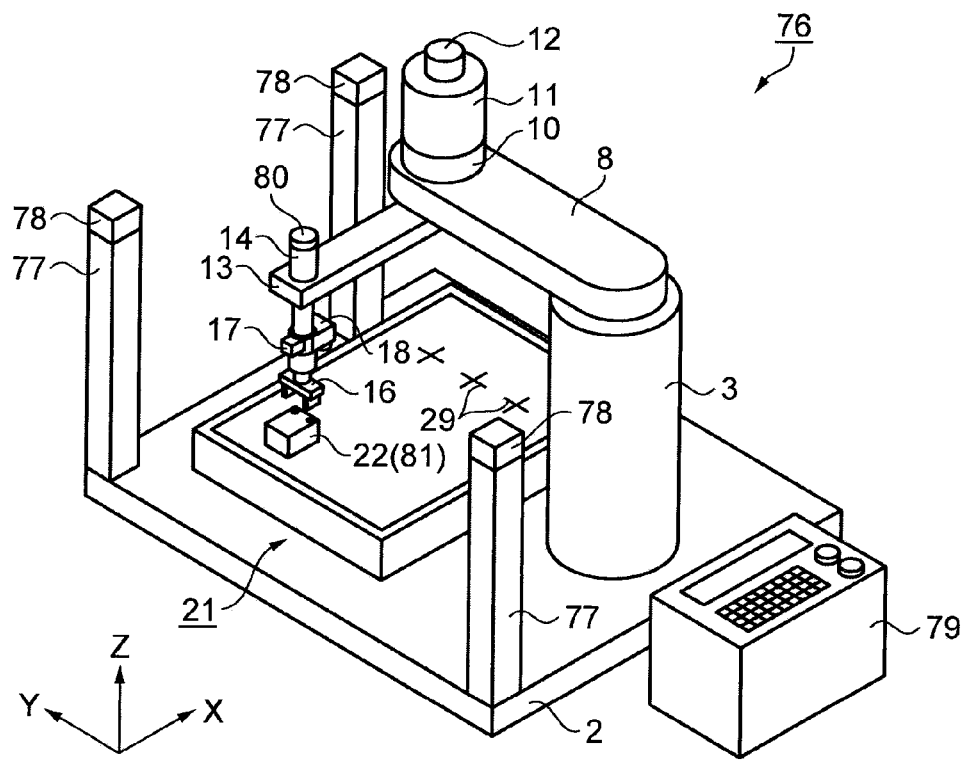
FIG. 8 is a schematic perspective view showing the configuration of a robot according to a third embodiment of the invention.

FIG. 8 is a schematic perspective view showing the configuration of the robot. As shown in FIG. 8, in the robot 76, support portions 77 that are formed longitudinally in the Z direction are disposed in three locations that are close to the periphery of the base 2. In addition, on the side of the support portion 77 in the Z direction, an ultrasonic receiver 78 is disposed. Furthermore, on the side of the elevation device 14 in the Z direction, an ultrasonic transmitter 80 is disposed. The robot 76 includes a control device 79. The control device 79 includes driving circuits and control units of the ultrasonic receiver 78 and the ultrasonic transmitter 80.

The control device 79 sequentially transmits ultrasonic waves from the ultrasonic transmitter 80. Then, the control device 79 allows the ultrasonic receivers 78 to receive the ultrasonic waves. The control device 79 analyzes the arrival times at which the ultrasonic waves transmitted by the ultrasonic transmitter 80 arrives at the ultrasonic receivers 78, thereby detecting the distance between each ultrasonic receiver 78 and the ultrasonic transmitter 80. Then, the location at which the ultrasonic transmitter 80 is positioned is calculated by using a triangulation method. The relative positions of the ultrasonic transmitter 80 and the hand portion 16 are known in advance. Accordingly, the control device 79 can calculate the position of the hand portion 16.

In the work 22, an ultrasonic transmitter 81 is also disposed. The ultrasonic transmitter 81 transmits the ultrasonic waves for each time distance. Then, each ultrasonic receiver 78 receives the ultrasonic waves transmitted by the ultrasonic transmitter 81. Next, the control device 79 calculates the location at which the ultrasonic transmitter 81 is positioned by using a triangulation method. Then, the control device 79 detects the location at which the work 22 is positioned.

In the first movement process of Step S1, the control device 79 calculates a distance between the hand portion 16 and the work 22. Then, when the distance between the hand portion 16 and the work 22 is smaller than a determination value, the process proceeds from the first movement process of Step S1 to the second movement process of Step S4.

As described above, according to this embodiment, the following advantages are acquired.

(1) According to this embodiment, the ultrasonic waves transmitted by the ultrasonic transmitters 80 and 81 are received by the ultrasonic receivers 78, whereby the distance between the work 22 and the hand portion 16 is detected. Even in a case where the work 22 is moved, the process may be configured to proceed from the first movement process of Step S1 to the second movement process of Step S4 when the distance between the work 22 and the hand portion 16 becomes the determination value.

Fourth Embodiment

Next, a robot according to an embodiment will be described with reference to FIGS. 9A and 9B. A difference between this embodiment and the first embodiment is that the hand portion 16 grips the work 22 so as to move to the mark 29 in this embodiment. Thus, the description of the same points as those of the first embodiment will be omitted, and only different points will be described. Other points are the same as those of the first embodiment.

Figure 9A:
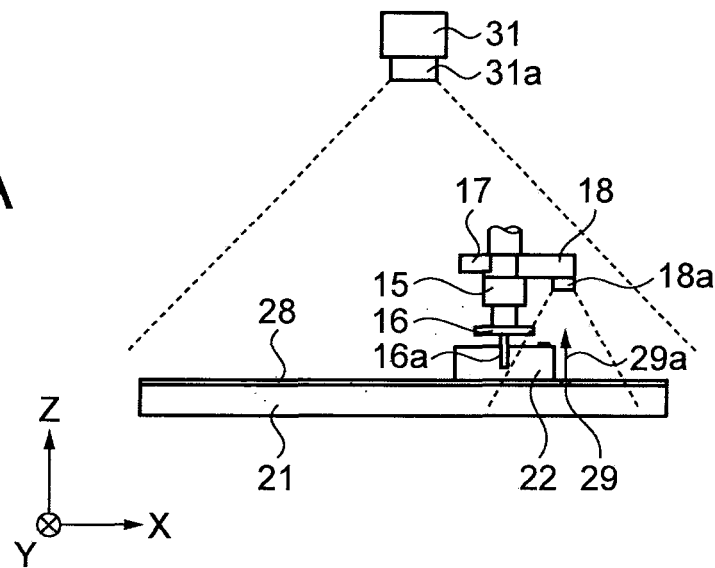
FIGS. 9A and 9B are schematic diagrams illustrating a robot control method according to a fourth embodiment of the invention.
Figure 9B:
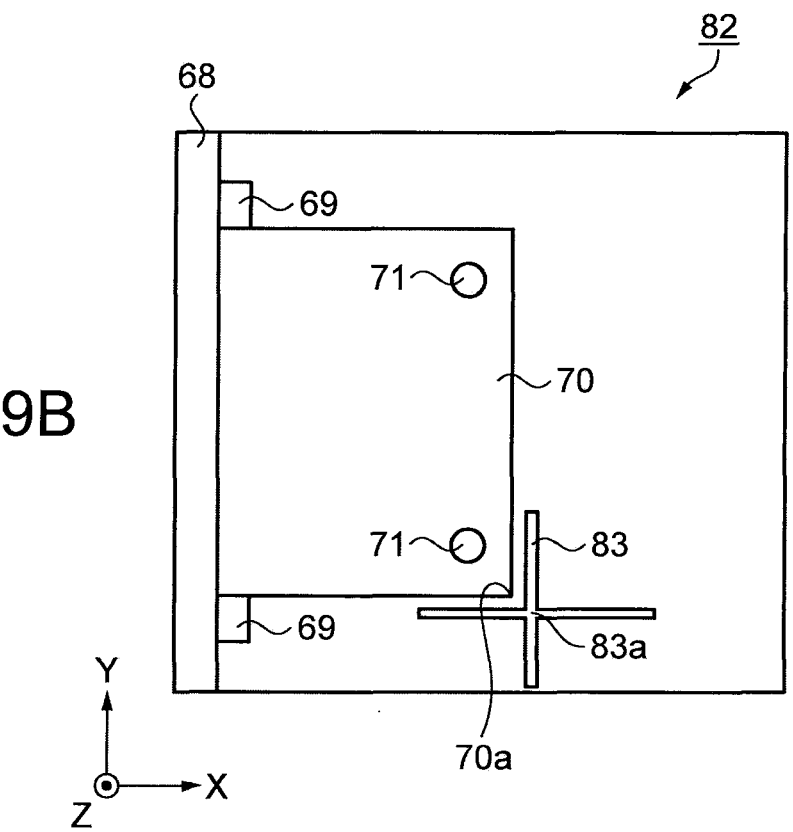

FIGS. 9A and 9B are schematic diagrams illustrating a robot control method in the operation of moving the hand portion. The figures correspond to the second movement process of Step S4 and the vibration suppressing process of Step S5. As shown in FIG. 9A, in Step S4, the hand portion 16 is moved with the work 22 being gripped. On the base 2, a mark 29 is formed, and the first imaging device 18 photographs the work 22 and the mark 29. The mark 29 is formed such that a part of light of the cold-cathode tube 24 disposed inside the mounting stand 21 is shielded in the mask substrate 28. Light 29a having the shape of the mark formed on the mask substrate 28 is irradiated from the mounting stand 21 toward the first imaging device 18.

FIG. 9B shows an image photographed by the first imaging device 18. In the image 82, a hand portion image 68, finger portion images 69, a work image 70, and a mark image 83 corresponding to the hand portion 16, the finger portions 16a, the work 22, and the mark 29 are photographed. The image calculating unit 51 calculates the position of the mark image 83 on the image 82. The mark image 83 is a diagram acquired by intersecting two straight lines. Then, the image calculating unit 51 calculates the coordinates of an intersection portion 83a that is the location of intersection. Then, the second movement destination control section 49b overlaps the intersection portion 83a and a corner 70a of the work image 70 that is located on the lower right side in the figure by driving the robot 1. At this time, the second movement destination control section 49b repeatedly performs photographing using the first imaging device 18, calculation of the relative positions of the work 22 and the mark 29, and movement of the hand portion 16.

As described above, according to this embodiment, the following advantages are acquired.

(1) According to this embodiment, the first imaging device 18 photographs the mark 29. The first imaging device 18 is disposed in the elevation device 14. Accordingly, the relative positions of the elevation device 14 and the hand portion 16 are fixed. Therefore, the relative positions of the mark 29 and the hand portion 16 can be recognized by detecting the relative positions of the first imaging device 18 and the mark 29. Then, the position of the mark 29 in the mounting stand 21 is fixed and known. Accordingly, the position of the hand portion 16 in the mounting stand 21 can be detected by the control device 32.

(2) According to this embodiment, the mark 29 is formed by irradiating light 29a having the shape of the mark 29. Accordingly, the mark 29 allows the luminance to be high. Therefore, the mark image 83 of the photographed image 82 becomes an image having high contrast. As a result, the mark image 83 can be easily detected from the photographed image 82.

Fifth Embodiment

Next, a robot according to an embodiment will be described with reference to FIG. 10. A difference between this embodiment and the first embodiment is that a step motor is used as the motor in this embodiment. Thus, the description of the same points as those of the first embodiment will be omitted, and only different points will be described. Other points are the same as those of the first embodiment.

Figure 10:
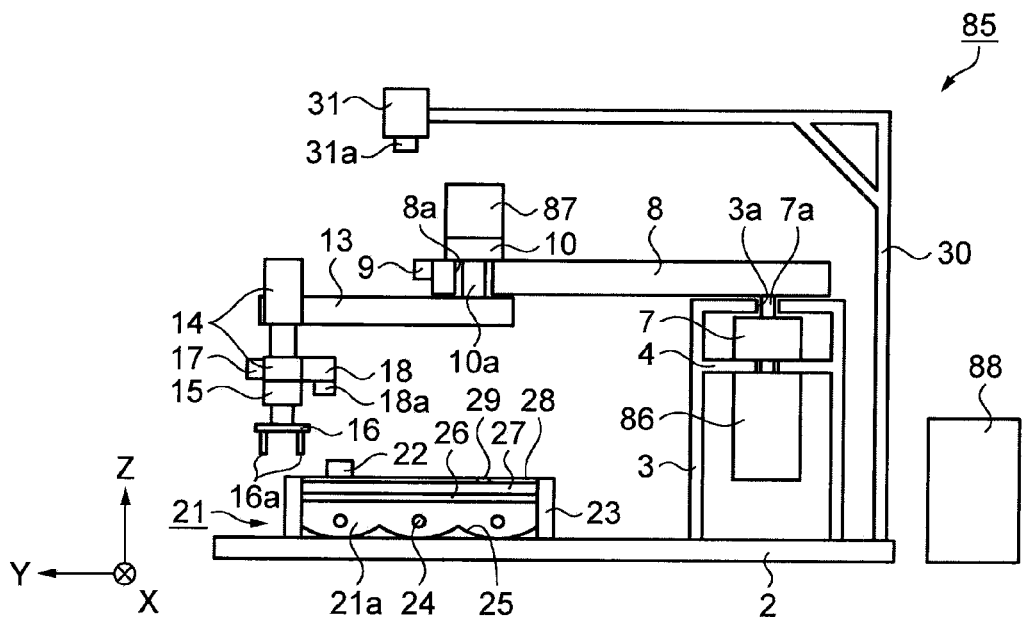
FIG. 10 is a schematic cross-sectional view showing the configuration of a robot according to a fifth embodiment of the invention.

FIG. 10 is a schematic cross-sectional view showing the configuration of a robot. In the robot 85, a third motor 86 as a driving unit is disposed inside the support bar 3. The third motor 86 is a step motor. Thus, the third motor 86 is a motor that rotates by an angle corresponding to the number of input pulses. On the upper side of a support plate 4, a first decelerator 7 is disposed, and the third motor 86 is connected to the input shaft of the first decelerator 7. On the upper side of the first decelerator 7, an output shaft 7a is disposed. The output shaft 7a rotates at a rotation speed that is acquired by decelerating the rotation speed of the third motor 86.

On the first arm portion 8, in a corner opposite to the third motor 86, a second decelerator 10 and a fourth motor 87 as a driving unit are disposed in the above-mentioned order in an overlapping manner. The fourth motor 87 is a step motor. Thus, the fourth motor 87 is a motor that rotates by an angle corresponding to the number of input pulses. In addition, the rotation shaft of the fourth motor 87 is connected to the input shaft of the second decelerator 10. An output shaft 10a of the second decelerator 10 is disposed in the downward direction in the figure. The output shaft 10a of the second decelerator 10 is rotated at a rotation speed that is acquired by decelerating the rotation speed of the rotation shaft of the fourth motor 87. A second arm portion 13 is disposed so as to be connected to the output shaft 10a, and the second arm portion 13 is rotated in correspondence with the rotation of the output shaft 10a.

The robot 85 includes a control device 88 as a position control device. The control device 88 includes driving circuits that drive the third motor 86 and the fourth motor 87. In addition, the robot 85 includes a control device that controls the rotation angles of the third motor 86 and the fourth motor 87 by controlling the numbers of pulses having pulse waveforms used for driving the third motor 86 and the fourth motor 87.

As described above, according to this embodiment, the following advantages are acquired.

(1) According to this embodiment, as the third motor 86 that rotates the first arm portion 8 and the fourth motor 87 that rotates the second arm portion 13, step motors are used. The driving signal of the step motor is a pulse waveform, and the driving shaft of the step motor is rotated in correspondence with the number of waves of the pulse waveforms. Accordingly, the movement amount of the movable portion can be controlled by controlling the driving signal of the step motor. A rotary encoder is not necessary for the step motor. However, there are cases where a step-out phenomenon occurs in which the current rotation angle is lost. According to this position control device, by the detection of the position of the hand portion 16 by using the first imaging device 18 after recovery from the step-out phenomenon, the hand portion 16 can be moved to a predetermined position by using the step motor. In addition, a rotary encoder is not necessary for the step motor. Accordingly, the configuration can be simplified.

Sixth Embodiment

Next, a crane according to an embodiment will be described with reference to FIG. 11. In the crane of this embodiment, the same control method as the control method of the robot in the first embodiment is used. Thus, the description of the same points as those of the first embodiment will be omitted, and only different points will be described. Other points are the same as those of the first embodiment.

Figure 11:
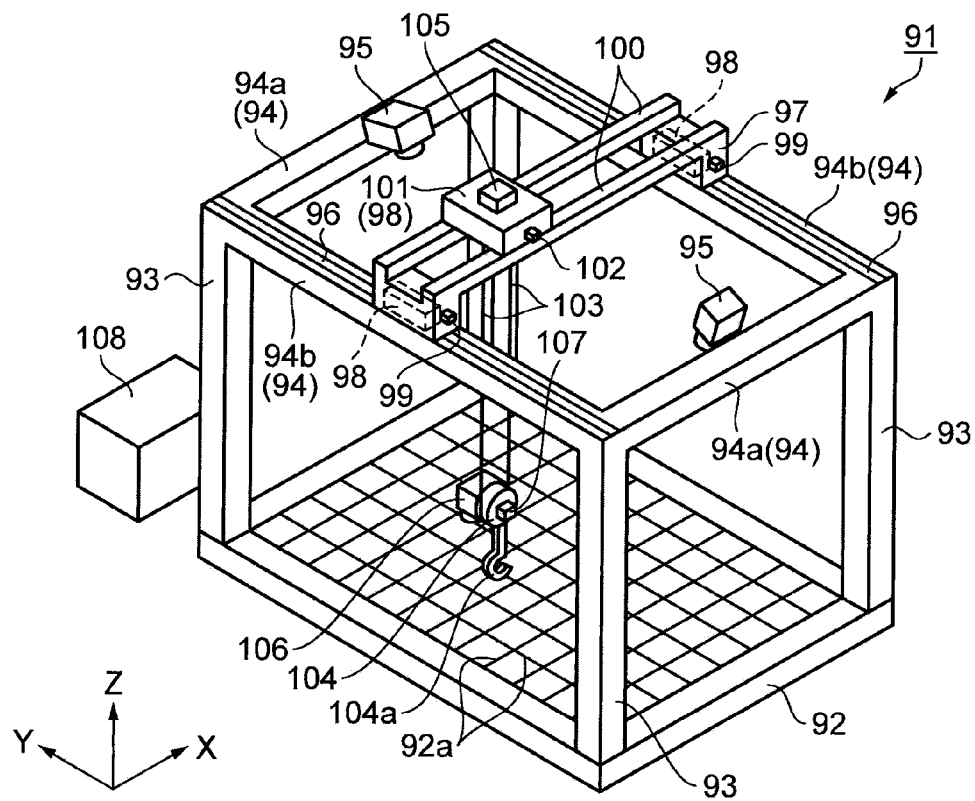
FIG. 11 is a schematic perspective view showing the configuration of a crane according to a sixth embodiment of the invention.

FIG. 11 is a schematic perspective view showing the configuration of the crane. As shown in FIG. 11, the crane 91 as a robot includes a base 92 having the shape of a rectangular plate. The longitudinal direction of the base 92 is assumed to be the Y direction, and the direction perpendicular to the Y direction in the horizontal direction is assumed to be the X direction. In addition, the vertical direction is assumed to be the Z direction. On the face of the base 92 in the Z direction, marks 92a having a lattice shape are formed. The marks 92a are configured by lines extending in the X direction and lines extending in the Y direction. The lines are disposed to be equally spaced, and symbols are formed in the intersections of the lines. The coordinates of each of the intersections can be recognized by a symbol.

On four corners of the base 92, support posts 93 extending in the vertical direction in the figure are set up. On the upper side of the support posts 93, a bridge portion 94 having a rectangular frame shape is disposed. The bridge portion 94 is configured by two first beams 94a disposed in the X direction and two second beams 94b disposed in the Y direction. In addition, on the center of each of the first beams 94a, a first imaging device 95 is disposed. The two first imaging devices 95 can photograph all the locations on the face on which the marks 92a of the base 92 are disposed.

On the faces of the two second beams 94b that are located on the upper side in the figure, longitudinal rails 96 extending in the Y direction are disposed. In addition, on the two longitudinal rails 96, crane girders 97 are disposed. Inside the crane girder 97, a travel device 98 as a driving unit is disposed. The travel device 98 is configured by a motor, a rotary encoder, a reduction gear, a wheel, and the like. The rotation shaft of the motor is connected to the reduction gear, and the output shaft of the reduction gear is connected to the wheel. The wheel is disposed on the longitudinal rail 96, and the wheel moves on the longitudinal rail 96. By rotating the motor, the wheel moves on the longitudinal rail 96. In addition, the crane girder 97 travels on the longitudinal rail 96. In the motor, a rotary encoder is disposed. Thus, by detecting the rotation angle of the motor, the travel device 98 can detect the movement amount of the crane girder 97. On both sides of the crane girder 97 in the X direction, first acceleration sensors 99 are disposed. The first acceleration sensor 99 detects the vibration of the crane girder 97.

On the upper side of the crane girder 97 in the figure, lateral rails 100 are disposed so as to extend in the X direction. On the upper side of the lateral rail 100 in the figure, a carriage 101 (also called a trolley) is disposed. Inside the carriage 101, a travel device 98 that is similar to the crane girder 97 is disposed, and thus the carriage 101 can move on the lateral rail 100 in the X direction. In addition, the travel device 98 of the carriage 101 includes a rotary encoder. Accordingly, the travel device 98 can detect the movement amount of the carriage 101. In addition, in the carriage 101, a second acceleration sensor 102 is disposed. The second acceleration sensor 102 detects the vibration of the carriage 101.

On the lower side of the carriage 101 in the figure, a hook block 104 as a movable portion is disposed through a wire 103. On the upper side of the carriage 101 in the figure, a hoist gear 105 as a driving unit is disposed. The hook block 104 can be vertically moved as the hoist gear 105 rolls up or discharges the wire 103. Inside the hoist gear 105, a motor, a rotary encoder, a reduction gear, a pulley, and the like are included. The rotation shaft of the motor is connected to the reduction gear, and the output shaft of the reduction gear is connected to the pulley. As the hoist gear 105 rotates the motor, the hoist gear 105 rolls up or discharges the wire 103. At this time, the hoist gear 105 can detect the movement amount of the hook block 104 by using the output of the rotary encoder.

In the hook block 104, a hook 104a, a second imaging device 106, and a third acceleration sensor 107 are disposed. The second imaging device 106 can detect a distance between the hook 104a and a specific location on the XY plane by simultaneously photographing the mark 92a and the hook 104a. The first imaging device 95 can detect a distance between the hook 104a and a specific location by simultaneously photographing the mark 92a and the hook 104a. The third acceleration sensor 107 detects the vibration of the hook block 104.

On the left side of the base 92 in the figure, a control device 108 as a position control device is disposed. The control device 108 is a device that controls the crane girder 97, the carriage 101, and the hoist gear 105. The control device 108 performs control to move the hook 104a to a target location and stop the hook 104a. In particular, the control device 108 moves the hook 104a in the Y direction by driving the crane girder 97. In addition, the control device 108 moves the hook 104a in the X direction by driving the carriage 101. Furthermore, the control device 108 moves the hook 104a in the Z direction by driving the hoist gear 105. The moving range of the hook 104a is within the range photographed by the first imaging device 95. The control device 108 includes an image calculating unit that analyzes an image that is photographed by the first imaging device 95. The image calculating unit can calculate the location at which the hook 104a is positioned by analyzing the image that is photographed by the first imaging device 95.

The control device 108 controls the position of the hook 104a by using a method that is similar to the robot control method of the first embodiment. In other words, the control device 108 moves the hook 104a through the first movement process and the second movement process. First, in the first movement process, the control device 108 allows the hook 104a to approach a target location by driving the crane girder 97, the carriage 101, and the hook block 104. At this time, the control device 108 controls the movement amounts of the crane girder 97, the carriage 101, and the hook block 104 by using the output of the rotary encoder. In addition, the control device 108 performs control to suppress the vibrations of the crane girder 97, the carriage 101, and the hook block 104 by using the outputs of the first acceleration sensor 99, the second acceleration sensor 102, and the third acceleration sensor 107.

Next, in the second movement process, the control device 108 moves the hook 104a to the target location by driving the crane girder 97, the carriage 101, and the hook block 104. At this time, the control device 108 detects the location of the hook 104a by using the output of the second imaging device 106. Then, the control device 108 moves the hook 104a to the target location by controlling the crane girder 97, the carriage, 101, and the hook block 104. In addition, the control device 108 performs control to suppress the vibrations of the crane girder 97, the carriage 101, and the hook block 104 by using the outputs of the first acceleration sensor 99, the second acceleration sensor 102, and the third acceleration sensor 107.

As described above, according to this embodiment, the following advantages are acquired.

(1) According to this embodiment, the control device 108 performs control to move the movable portion through the first movement process and the second movement process. In the first movement process, the control device 108 controls the movement amounts of the crane girder 97, the carriage 101, and the hook block 104 by detecting the movement amounts of the crane girder 97, the carriage 101, and the hook block 104. Then, in the second movement process, the control device 108 controls the location of the hook 104a by detecting the location of the hook 104a. The amount of information on the movement amounts that is detected in the first movement process is smaller than that of the information on the location that is detected in the second movement process. Accordingly, calculation for the control process can be performed more quickly in the first movement process than in the second movement process. Accordingly, in the first movement process, the control process of moving the crane girder 97, the carriage 101, and the hook block 104 can be performed more quickly than in the second movement process. Then, in the second movement process, the crane girder 97, the carriage 101, and the hook block 104 are controlled by detecting the location of the hook 104a and the target location. Accordingly, the hook 104a can be reliably moved to the target location.

(2) According to this embodiment, the control device 108 can control the position of the hook 104a with high precision. Therefore, this crane 91 can be operated with high quality.

Seventh Embodiment

Next, an IC (Integrated Circuit) test handler according to an embodiment will be described with reference to FIG. 12. In the IC test handler of this embodiment, a control method that is similar to the robot control method of the first embodiment is used. Thus, the description of the same points as those of the first embodiment will be omitted, and only different points will be described. Other points are the same as those of the first embodiment.

Figure 12:
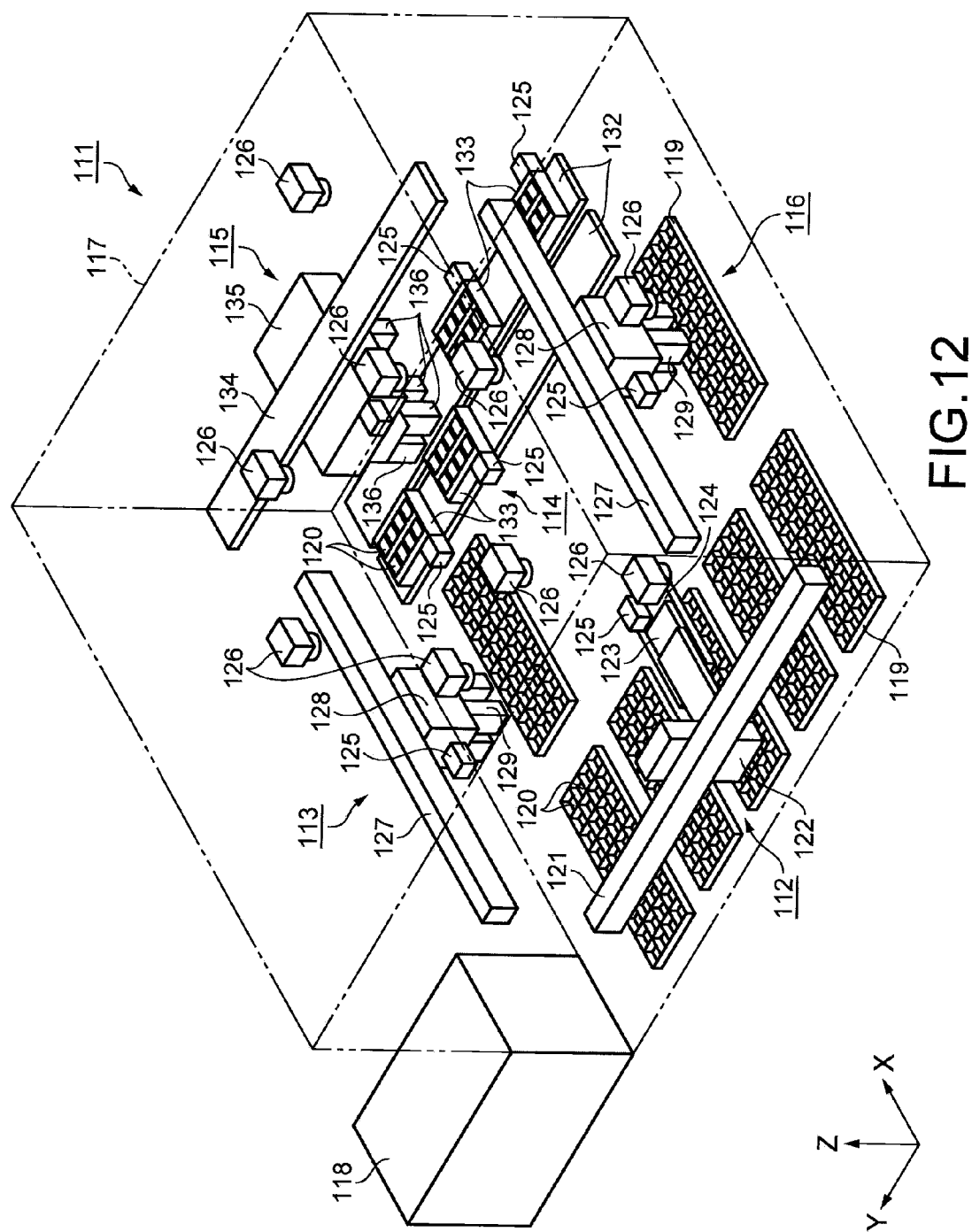
FIG. 12 is a schematic perspective view showing the configuration of an IC test handler according to a seventh embodiment of the invention.

FIG. 12 is a schematic perspective view showing the configuration of the IC test handler. As shown in FIG. 12, the IC test handler 111 is configured as a robot by a tray transporting robot 112, a device supplying robot 113, a device supplying shuttle 114, a device measuring robot 115, a device classifying robot 116, and a control device 118 that controls the above-described devices. In addition, devices other than the control device 118 are disposed inside an external package 117, and the control device 118 is disposed on the left side of the external package 117 in the figure.

The tray transporting robot 112 is a device that moves a tray 119. The tray transporting robot 112 supplies the tray 119 on which an IC 120 is disposed to the device supplying robot 113. The device supplying robot 113 is a device that supplies the IC 120 disposed on the tray 119 to the device supplying shuttle 114. After the device supplying robot 113 moves the IC 120, the tray 119 on which the IC 120 is cleared out is moved by the tray transporting robot 112. Next, the tray transporting robot 112 supplies the tray 119 on which an IC 120 is disposed to the device supplying robot 113.

The device supplying shuttle 114 is a device that extracts the IC 120 from the tray 119 and supplies the IC 120 to the device measuring robot 115. The device supplying shuttle 114 moves the IC 120 to a location facing the device measuring robot 115. Then, the device measuring robot 115 adsorbs the IC 120. The device measuring robot 115 is electrically connected to a test device, not shown in the figure, that tests the electrical characteristics of the IC 120. In the IC 120, a plurality of input terminals and a plurality of output terminals are formed. The device measuring robot 115 inputs signals to the input terminals of the IC 120, and transmits signals that are output from the output terminals to the test device.

Next, the device measuring robot 115 disposes the IC 120 for which the test has been completed to the device supplying shuttle 114. The device supplying shuttle 114 supplies the IC 120 for which the test has been completed to the device classifying robot 116. The device classifying robot 116 is a device that classifies the IC 120 by using signals of the test results of the IC 120 that are output by the test device. The device classifying robot 116 moves the IC 120 from the device supplying shuttle 114 to the tray 119. At this time, the device classifying robot 116 classifies and disposes the IC 120 at predetermined location inside the tray 119 based on a signal of the test result output from the test device.

After the IC 120 is disposed inside the tray 119, the tray transporting robot 112 moves the tray 119 on which the IC 120 is disposed and supplies the tray 119 on which the IC 120 is not disposed to the device classifying robot 116.

The tray transporting robot 112 includes a guide rail 121 that is formed longitudinally in one direction. The direction in which the guide rail 121 extends is assumed to be the Y direction. The direction perpendicular to the Y direction on the horizontal plane is assumed to be the X direction, and the vertical direction is assumed to be the Z direction. The tray transporting robot 112 includes a movement table 122 as a movable portion that is moved along the guide rail 121. Inside the movement table 122, a direct acting mechanism as a driving unit is disposed. In the guide rail 121, a linear encoder is disposed, and an encoder detector that detects a scale formed in the linear encoder is disposed in the movement table 122. The control device 118 can detect the movement amount of the movement table 122 by using the output of the encoder detector. On a face of the movement table 122 in the X direction, an arm portion 123 that expands or contracts in the X direction is disposed. In addition, on the lower side of the arm portion 123 in the figure, a grip portion 124 is disposed. The grip portion 124 includes one pair of finger portions and a direct acting mechanism that changes the gap between the finger portions. The grip portion 124 can grip the tray 119 by interposing the tray 119 between the finger portions.

In the grip portion 124, an acceleration sensor 125 and an imaging device 126 as a vibration detecting unit and an inertial sensor are disposed. The control device 118 detects the vibration of the grip portion 124 by receiving the output of the acceleration sensor 125 as input and performs control to suppress the vibration of the grip portion 124.

The control device 118 moves the grip portion 124 to a location facing the target tray 119. At this time, the control device 118 controls the position of the grip portion 124 by using a method that is similar to the robot control method of the first embodiment. In other words, the control device 118 moves the grip portion 124 through the first movement process and the second movement process. First, in the first movement process, the control device 118 allows the grip portion 124 to approach a target location by driving the movement table 122 and the arm portion 123. At this time, the control device 118 controls the movement amount of the movement table 122 by using the output of the encoder detector. In addition, the control device 118 performs control to suppress the vibration of the grip portion 124 by using the output of the acceleration sensor 125.

Next, in the second movement process, the control device 118 moves the grip portion 124 to the target location by driving the movement table 122 and the arm portion 123. At this time, the control device 118 detects the location of the grip portion 124 by using the output of the imaging device 126. Then, the control device 118 moves the grip portion 124 to the target location by controlling the movement of the movement table 122 and the arm portion 123. At this time, the control device 118 performs control to suppress the vibration of the grip portion 124 by using the output of the acceleration sensor 125.

On the upper side of the external package 117, the imaging device 126 is disposed. Then, the imaging device 126 photographs the devices and the trays 119 that are disposed inside the external package 117. The control device 118 can detect the locations of the trays 119 and the positions and states of the devices by using a photographed image.

The device supplying robot 113 includes a guide rail 127 that is formed longitudinally in the X direction. The device supplying robot 113 includes a movement table 128 as a movable portion that is moved along the guide rail 127. Inside the movement table 128, a direct acting mechanism as a driving unit is disposed. In the guide rail 127, a linear encoder is disposed, and an encoder detector that detects a scale formed in the linear encoder is disposed in the movement table 128. The control device 118 can detect the movement amount of the movement table 128 by using the output of the encoder detector. On the lower side of the movement table 128 in the figure, an adsorption portion 129 that expands or contracts in the Z direction is disposed. The adsorption portion 129 includes a direct acting mechanism that expands or contracts in the Z direction and a vacuum chuck that adsorbs the IC 120. The control device 118 can adsorb the IC 120 to the adsorption portion 129 by operating the vacuum chuck after pressing the adsorption portion 129 to the IC 120 located inside the tray 119.

In the movement table 128, an acceleration sensor 125 and an imaging device 126 are disposed. The control device 118 detects the vibration of the movement table 128 by receiving the output of the acceleration sensor 125 as input and performs control to suppress the vibration of the grip portion 124.

The control device 118 moves the adsorption portion 129 to a location facing the target IC 120. At this time, the control device 118 controls the position of the adsorption portion 129 by using a method that is similar to the robot control method of the first embodiment. In other words, the control device 118 moves the adsorption portion 129 through the first movement process and the second movement process. First, in the first movement process, the control device 118 allows the adsorption portion 129 to approach the target location by driving the movement table 128. At this time, the control device 118 controls the movement amount of the movement table 128 by using the output of the encoder detector. In addition, the control device 118 performs control to suppress the vibration of the movement table 128 by using the output of the acceleration sensor 125.

Next, in the second movement process, the control device 118 moves the adsorption portion 129 to the target location by driving the movement table 128. At this time, the control device 118 detects the location of the adsorption portion 129 by using the output of the imaging device 126. Then, the control device 118 moves the adsorption portion 129 to the target location by controlling the movement of the movement table 128. At this time, the control device 118 performs control to suppress the vibration of the movement table 128 by using the output of the acceleration sensor 125.

The device classifying robot 116 and the device supplying robot 113 have the same structure. Thus, the description of the device classifying robot 116 is omitted. When driving the device classifying robot 116, the control device 118 moves the adsorption portion 129 by using a method that is similar to the method used for driving the device supplying robot 113.

The device supplying shuttle 114 includes a guide rail 132 that is formed longitudinally in the Y direction and a movement table 133 as a movable portion that is moved along the guide rail 132. Inside the movement table 133, a direct acting mechanism as a driving unit is disposed. In the guide rail 132, a linear encoder is disposed, and an encoder detector that detects a scale formed in the linear encoder is disposed in the movement table 133. The control device 118 can detect the movement amount of the movement table 133 by using the output of the encoder detector. On the surface of the movement table 133, a vacuum chuck that adsorbs the IC 120 is included. The control device 118 can reliably move the IC 120 by moving the movement table 133 after adsorbing the IC 120 to the surface of the movement table 133.

In the movement table 133, an acceleration sensor 125 is disposed. The control device 118 detects the vibration of the movement table 133 by receiving the output of the acceleration sensor 125 as input and performs control to suppress the vibration of the grip portion 124.

At locations facing the guide rail 132 on the upper side of the guide rail 132 in the figure, two imaging devices 126 are disposed. The imaging devices 126 photograph the movement tables 133. On the guide rail 132, a mark not shown in the figure is formed at a location at which the movement table 133 is to be stopped. The imaging device 126 can detect a distance between the mark and the movement table 133 by photographing the mark and the movement table 133 in the same image.

The control device 118 moves the IC 120 to the target location. At this time, the control device 118 controls the position of the adsorption portion 129 by using a method that is similar to the robot control method of the first embodiment. In other words, the control device 118 moves the adsorption portion 129 through the first movement process and the second movement process. First, in the first movement process, the control device 118 allows the movement table 133 to approach the target location by moving the movement table 133. At this time, the control device 118 controls the movement amount of the movement table 133 by using the output of the encoder detector. In addition, the control device 118 performs control to suppress the vibration of the movement table 133 by using the output of the acceleration sensor 125.

Next, in the second movement process, the control device 118 moves the movement table 133 to the target location. At this time, the control device 118 detects the location of the movement table 133 by using the output of the imaging device 126. Then, the control device 118 moves the movement table 133 to the target location by controlling the movement of the movement table 133. At this time, the control device 118 performs control to suppress the vibration of the movement table 133 by using the output of the acceleration sensor 125.

The device measuring robot 115 includes a guide rail 134 that is formed longitudinally in the Y direction and a movement table 135 as a movable portion that is moved along the guide rail 134. Inside the movement table 135, a direct acting mechanism as a driving unit is disposed. In the guide rail 134, a linear encoder is disposed, and an encoder detector that detects a scale formed in the linear encoder is disposed in the movement table 135. The control device 118 can detect the movement amount of the movement table 135 by using the output of the encoder detector. On the lower side of the movement table 135 in the figure, an adsorption portion 136 that expands or contacts in the Z direction is disposed. The adsorption portion 136 includes a direct acting mechanism that expands or contracts in the Z direction and a vacuum chuck that adsorbs the IC 120. The control device 118 can adsorb the IC 120 to the adsorption portion 136 by operating the vacuum chuck after pressing the adsorption portion 136 to the IC 120 located on the movement table 135. The adsorption portion 136 includes an electrode that transmits or receives an electrical signal to or from the IC 120. The device measuring robot 115 tests the electrical characteristics of the IC 120 by transmitting and receiving electrical signals to or from the IC 120 through this electrode.

In the movement table 135, an acceleration sensor 125 and an imaging device 126 are disposed. The control device 118 detects the vibration of the movement table 135 by receiving the output of the acceleration sensor 125 as input and performs control to suppress the vibration of the movement table 128.

The control device 118 moves the adsorption portion 136 to a location facing the target IC 120. At this time, the control device 118 controls the position of the adsorption portion 136 by using a method that is similar to the robot control method of the first embodiment. In other words, the control device 118 moves the adsorption portion 136 through the first movement process and the second movement process. First, in the first movement process, the control device 118 allows the adsorption portion 136 to approach the target location by driving the movement table 135. At this time, the control device 118 controls the movement amount of the movement table 135 by using the output of the encoder detector. In addition, the control device 118 performs control to suppress the vibration of the movement table 135 by using the output of the acceleration sensor 125.

Next, in the second movement process, the control device 118 moves the adsorption portion 136 to the target location by driving the movement table 135. At this time, the control device 118 detects the location of the adsorption portion 136 by using the output of the imaging device 126. Then, the control device 118 moves the adsorption portion 136 to the target location by controlling the movement of the movement table 135 by using the output of the imaging device 126 disposed on the movement table 135. At this time, the control device 118 performs control to suppress the vibration of the movement table 135 by using the output of the acceleration sensor 125.

(1) According to this embodiment, the control device 118 can control the positions of the grip portion 124 and the movement tables 128, 133, and 135 with high precision. Therefore, the IC test handler 111 can be operated with high quality.

(2) According to this embodiment, the control device 118 suppresses the vibrations of the grip portion 124 and the movement tables 128, 133, and 135. Thus, after moving the grip portion 124 and the movement tables 128, 133, and 135, the control device 118 can perform the next operation in a speedy manner. As a result, the IC test handler 111 can be operated with high productivity.

Comparative Example

Next, a comparative example in which the behavior of a movable portion corresponding to a control method is represented will be described with reference to FIGS. 13A to 13C. This comparative example will be described by using the form of the robot control method according to the first embodiment. The description of the same points as those of the first embodiment will be omitted, and only different points will be described. Other points are the same as those of the first embodiment.

Figure 13A:
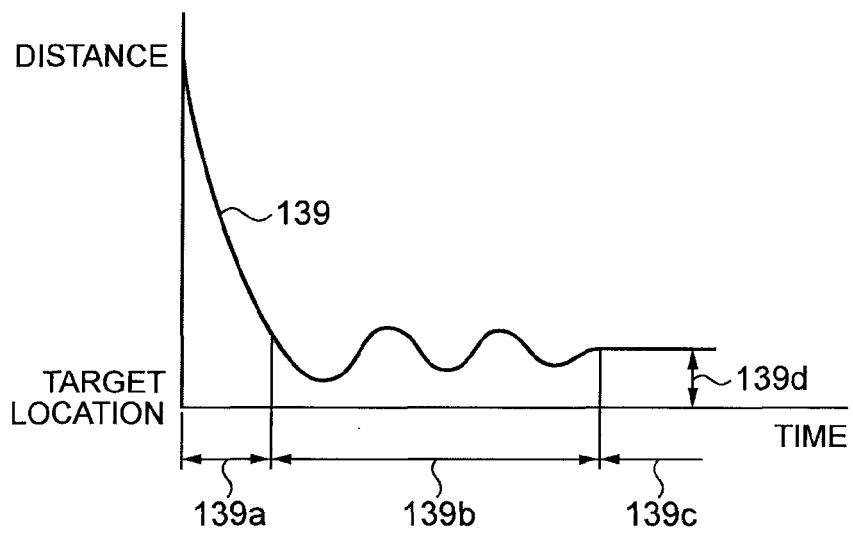
FIGS. 13A to 13C are timing charts representing the transition of moving a hand portion to a target location according to a comparative example.

FIG. 13A is a timing chart representing the transition of moving the hand portion to a target location when the control device 32 moves the hand portion 16 to the target location by using the first angle detector 6 and the second angle detector 12. In FIG. 13A, the vertical axis represents the distance between the hand portion 16 and the target location. In the vertical axis, the upper side represents a location that is separated farther from the target location than the lower side. The horizontal axis represents the elapse of time, and time progresses from the left side to the right side.

In FIG. 13A, a transition line 139 of the hand portion position represents the appearance of approach of the hand portion 16 to the target location. A time until the hand portion 16 stops after moving is divided into three intervals. First, the first interval 139a is an interval in which the hand portion 16 approaches the target location. In this interval, the control device 32 moves the hand portion 16 to the target location by using the outputs of the first angle detector 6 and the second angle detector 12. In the first interval 139a, the transition line 139 of the hand portion position becomes an arc-shaped curve.

In the second interval 139b, the control device 32 stops the movement of the hand portion 16. At that time, movable portions such as the first arm portion 8, the second arm portion 13, and the elevation device 14 vibrate. Accordingly, the transition line 139 of the hand portion position becomes a vibrating curve. In the third interval 139c, the vibration of the hand portion 16 converges. Accordingly, the transition line 139 of the hand portion position becomes a straight line. At this time, there are cases where the movable portions such as the first arm portion 8 and the second arm portion 13 are deformed by the heat or the like, or the hand portion 16 is bent due to the weight of the gripped work. In such a case, since the position of the hand portion 16 is influenced, and accordingly, a difference 139d between the transition line 139 of the hand portion position and the target location is generated.

Figure 13B:
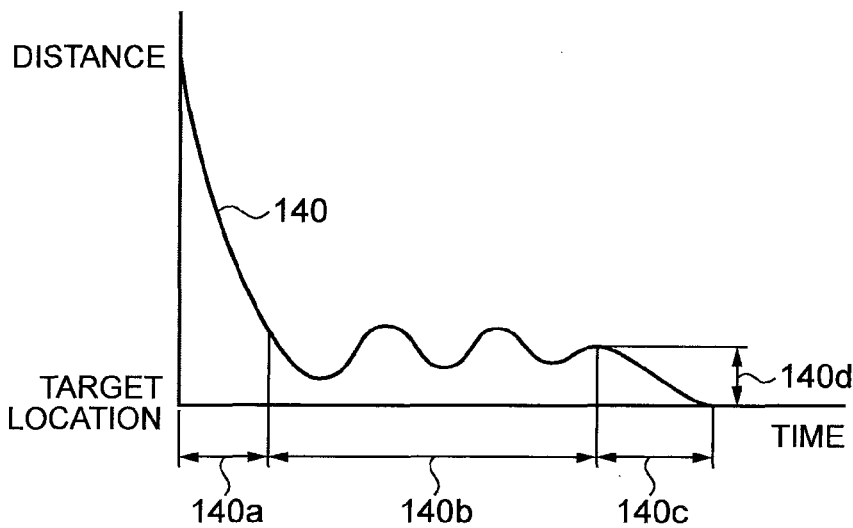

FIG. 13B is a timing chart representing the transition of movement of the hand portion 16 to the target location when the control device 32 moves the hand portion 16 to the target location by using the first angle detector 6, the second angle detector 12, and the first imaging device 18. In FIG. 13B, the transition line 140 of the hand portion position represents the appearance of approaching of the hand portion 16 to the target location. A time until the hand portion 16 stops after moving is divided into three intervals. First, the first interval 140a is an interval in which the hand portion 16 approaches the target location. In this interval, the control device 32 moves the hand portion 16 to the target location by using the outputs of the first angle detector 6 and the second angle detector 12. In the first interval 140a, the transition line 140 of the hand portion position becomes an arc-shaped curve.

In the second interval 140b, the control device 32 stops the movement of the hand portion 16. At that time, movable portions such as the first arm portion 8, the second arm portion 13, and the elevation device 14 vibrate. Accordingly, the transition line 140 of the hand portion position becomes a vibrating curve. In the first interval 140a and the second interval 140b, the transition line 140 of the hand portion position becomes the same curve as the transition line 139 of the hand portion position. In the third interval 140c, the control device 32 allows the first imaging device 18 to photograph the hand portion 16 and the target location. Then, the control device 32 detects a difference 140d between the hand portion 16 and the target location. Next, the control device 32 moves the hand portion 16 to the target location. As a result, the hand portion 16 can be positioned at the target location.

Figure 13C:
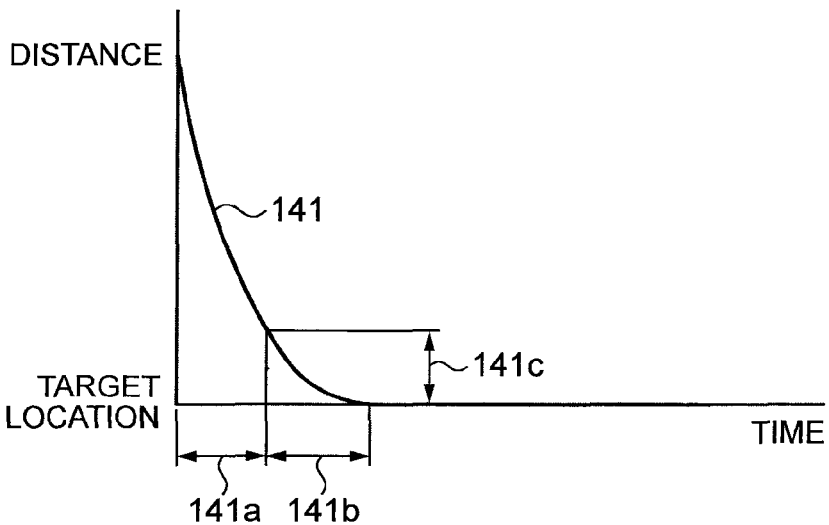

FIG. 13C is a timing chart representing the transition of movement of the hand portion 16 to the target location when the control device 32 moves the hand portion 16 to the target location by using the first angle detector 6, the second angle detector 12, the first imaging device 18, the first angular velocity sensor 9, and the second angular velocity sensor 17. In FIG. 13C, the transition line 141 of the hand portion position represents the appearance of approaching of the hand portion 16 to the target location.

A time until the hand portion 16 stops after moving is divided into two intervals. First, the first interval 141a is an interval in which the hand portion 16 approaches the target location. In this interval, the control device 32 moves the hand portion 16 to the target location by using the outputs of the first angle detector 6 and the second angle detector 12. This process corresponds to the first movement process of Step S1 of the first embodiment. Then, the vibration suppressing process of Step S2 is performed in a parallel manner. The control device 32 suppresses the vibration of the hand portion 16 by using the outputs of the first angular velocity sensor 9 and the second angular velocity sensor 17. Accordingly, the transition line 141 of the hand portion position does not vibrate and transits from the first interval 141a to the second interval 141b.

In the second interval 141b, the control device 32 allows the first imaging device 18 to photograph the hand portion 16 and the target location. Then, the control device 32 detects a difference 141c between the hand portion 16 and the target location. At this time, the hand portion 16 does not vibrate. Accordingly, an image photographed by the first imaging device 18 becomes an image having small blurring. Accordingly, the difference 141c between the hand portion 16 and the target location can be detected with high precision. Next, the control device 32 moves the hand portion 16 to the target location. As a result, the hand portion 16 can be positioned at the target location. This step corresponds to the second movement process of Step S4 of the first embodiment. Then, the vibration suppressing process of Step S5 is performed in a parallel manner.

(1) According to this comparative example, the control device 32 controls the position of the hand portion 16 by using the image that is photographed by the first imaging device 18. Accordingly, the position of the hand portion 16 can be controlled with high precision.

(2) According to this comparative example, the control device 32 suppresses the vibration of the hand portion 16. Accordingly, the control device 32 can transit from the first interval 141a to the second interval 141b in a speedy manner. As a result, the hand portion 16 can be moved to the target location in a speedy manner.

This embodiment is not limited to the above-described embodiments, and various changes or modifications can be made therein. Modified examples thereof will be described below.

Modified Example 1

In the above-described first embodiment, the second angular velocity sensor 17 is disposed in the elevation device 14. However, the second angular velocity sensor 17 may be disposed in the hand portion 16. The second angular velocity sensor 17 may be disposed in the hand portion 16 in a case where the second angular velocity sensor 17 can be disposed in the hand portion 16 without any interference. In such a case, the vibration of the hand portion 16 can be suppressed without difficulty.

Modified Example 2

In the above-described first embodiment, a robot having multiple horizontal joints is employed as the robot 1. However, the form of the robot is not limited thereto. Thus, various forms of robots such as a multiple vertical-joint robot, an orthogonal robot, and a parallel link robot may be employed. When the arm portion (also referred to as an arm or a link) of a robot is moved in a linear pattern, an acceleration sensor as an inertial sensor replacing the angular velocity sensor may be used. Even when the arm portion is moved in a linear pattern, the vibration can be detected. In addition, the first angle detector 6 and the second angle detector 12 may be replaced with linear encoders. Even when the arm portion is moved in a linear pattern, the movement amount of the arm portion can be detected with high precision.

Modified Example 3

In the above-described first embodiment, the mark 29 is a diagram acquired by intersecting two straight lines with each other. However, the mark is not limited thereto. The mark 29 may be a diagram, the position of which can be detected. For example, a mark of a circular shape, a polygonal shape, a corner portion, an asperity, or the like may be used. In addition, a repetition pattern and a mark such as a symbol identifying a location may be combined together. Furthermore, marks may be configured to be identified by using the marks of different colors.

Modified Example 4

In the above-described first embodiment, light is emitted in the shape of the mark 29 by disposing the cold-cathode tube 24 inside the mounting stand 21. However, a method of brightening the mark 29 is not limited thereto. Thus, it may be configured that the mark 29 is formed with a material having high reflectivity, and light is irradiated to the mark 29. Then, light that is reflected from the mark 29 may be photographed by the first imaging device 18 and the second imaging device 31. Furthermore, an LED (Light Emitting Diode), a fluorescent lamp, or the like may be used instead of the cold-cathode tube 24.

Modified Example 5

In the above-described first embodiment, the position detection mark 22a is disposed in the work 22, and the position of the work 22 is detected by using the position detection mark 22a. However, the detection of the position is not limited thereto. Thus, the position of the work 22 may be detected based on the shape of the work 22. In such a case, the position detection mark 22a does not need to be disposed in the work 22, and accordingly, the work 22 can be manufactured with high productivity.

Modified Example 6

In the above-described first embodiment, the vibration suppressing process of Step S2 and the vibration suppressing process of Step S5 are performed. However, when the vibration of the hand portion 16 is small, the vibration suppressing processes may be omitted. Depending on the situation, only Step S2 may be omitted, or only Step S5 may be omitted. Furthermore, Step S2 and Step S5 may be omitted together. When the vibration suppressing process is omitted, energy required for the control process is not necessary. Accordingly, a control process capable of saving energy can be performed.

Modified Example 7

In the above-described first embodiment, in the sensor switching process of Step S3, the hand portion-to-target distance 66 is detected by using the second imaging device 31. However, the hand portion-to-target distance 66 may be detected by using the first imaging device 18. Even in such a case, the same advantages can be acquired.

Modified Example 8

In the above-described first embodiment, the image 67 is formed by photographing the hand portion 16 and the work 22 by using the first imaging device 18. When the relative positions of the first imaging device 18 and the hand portion 16 is known, the first imaging device 18 may be configured to photograph only the work 22. In addition, it may be configured that the image calculating unit 51 detects the relative positions of the first imaging device 18 and the work 22, and the work position calculating unit 53 calculates the relative positions of the hand portion 16 and the work 22. By setting the first imaging device 18 not to photograph the hand portion 16, a wide range can be photographed.

Modified Example 9

In the above-described third embodiment, the positions of the elevation device 14 and the work 22 are detected by using the ultrasonic receiver 78, the ultrasonic transmitter 80, and the ultrasonic transmitter 81. However, the positions of the elevation device 14 and the work 22 may be detected by using an optical sensor other than the ultrasonic sensor. In such a case, the wavelength of light is shorter than that of the ultrasonic wave, and accordingly, the positions can be detected with high precision.

Modified Example 10

In the above-described sixth embodiment, an example in which the crane 91 is an overhead traveling crane is represented. However, the embodiment can be applied to a crane other than the overhead traveling crane. For example, the embodiment can be applied to various types of cranes such as a jib crane, a hammer-head crane, a luffing crane, and a wall crane. Even in such a case, by using the encoder, the imaging device, and the inertial sensor, the same advantages can be acquired.

Modified Example 11

In the above-described seventh embodiment, as an example of the robot, an example of the IC test handler 111 is described. However, the method according to an embodiment of the invention can be applied to an IC supplying device other than the IC test handler 111. For example, the method can be applied to various devices such as an IC mounting device, a device that attaches an IC to a tape, an IC molding device, and an IC marking device. Even in such a case, the same advantages can be acquired by using the encoder, the imaging device, and the inertial sensor.

What is claimed is:

1. A position control method for controlling a position of a movable portion according to instructions from a processor, the position control method comprising:
    causing a movement control unit to move the movable portion from a start position to a target position and operating an imaging unit according to a first instruction from the processor to detect relative position of the movable portion with respect to the target position; and
    detecting movement of the movable portion with an inertial sensor and suppressing a first vibration of the movable portion according to a second instruction from the processor,
    wherein at least a part of the first vibration is suppressed when the movable portion is between the start position and the target position.

2. The position control method according to claim 1, wherein, in the suppressing of the first vibration of the movable portion, the first vibration of the movable portion is suppressed by detecting the first vibration of the movable portion by using the inertial sensor and adding a second vibration having a phase opposite to that of the first vibration to the movable portion.

3. The position control method according to claim 1, wherein the relative position of the movable portion with respect to the target position is detected by imaging a mark from which relative position information with respect to the target position can be acquired and analyzing an imaged image.

4. The position control method according to claim 3,
    wherein the target position is on a vertical line passing through a location at which a work is disposed, and
    wherein the mark is disposed on the work.

5. The position control method according to claim 3, wherein the mark is formed so as to form a predetermined shape by irradiating light thereon.

6. A robot comprising:
    a movable portion;
    an imaging unit that detects a relative position of the movable portion with respect to a target position;
    a movement control unit that moves the movable portion from a start position to the target position by using information on an image captured by the imaging unit;
    an inertial sensor that detects movement of the movable portion; and
    a vibration suppressing control unit that suppresses a first vibration of the movable portion based on the detected movement of the movable portion;
    wherein at least a part of the first vibration is suppressed by the vibration suppressing control unit when the movable portion is between the start position and the target position.

7. The robot according to claim 6, wherein the imaging unit is disposed on the movable portion.

8. The robot according to claim 6, wherein a range in which the movable portion is moved is included in a range captured by the imaging unit.

9. The robot according to claim 6, further comprising a driving unit that drives the movable portion,
    wherein the driving unit includes a step motor.

10. The robot according to claim 6, further comprising
    a second vibration generation unit that generates a second vibration having a phase opposite to that of the first vibration, wherein
    the vibration suppressing control unit is suppress the first vibration by adding the second vibration to the movable portion.

11. The robot according to claim 6, wherein
the imaging unit outputs a position signal corresponding to the relative position of the movable portion with respect to the target position;
the inertial sensor outputs a velocity signal corresponding to the movement of the movable portion; and
further comprising an addition unit that composes a low-frequency component of the position signal and a high-frequency component of the velocity signal so as to form a suppressing signal; and
the vibration suppressing control unit receives the suppressing signal to suppress the first vibration.

* * * * *